(12) United States Patent
Berliner et al.

(10) Patent No.: US 11,646,784 B2
(45) Date of Patent: May 9, 2023

(54) UPLINK BEAM MANAGEMENT USING A CONFIGURABLE DEFLECTOR

(71) Applicant: QUALCOMM Incorporated, San Diego, CA (US)

(72) Inventors: Ran Berliner, Kfar-Aviv (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/246,012

(22) Filed: Apr. 30, 2021

(65) Prior Publication Data
US 2022/0352974 A1    Nov. 3, 2022

(51) Int. Cl.
*H04B 7/155* (2006.01)
*H04W 72/04* (2009.01)
*H04W 72/044* (2023.01)

(52) U.S. Cl.
CPC ..... *H04B 7/15514* (2013.01); *H04B 7/15528* (2013.01); *H04W 72/046* (2013.01); *H04W 72/0413* (2013.01)

(58) Field of Classification Search
CPC ............................ H04B 7/0617; H04B 7/0456
USPC ......................................................... 375/262
See application file for complete search history.

(56) References Cited

U.S. PATENT DOCUMENTS

2020/0028262 A1* 1/2020 Fang .................. H04B 7/15535

* cited by examiner

*Primary Examiner* — Sam K Ahn
*Assistant Examiner* — Gina M McKie
(74) *Attorney, Agent, or Firm* — Holland & Hart LLP

(57) ABSTRACT

Methods, systems, and devices for wireless communications are described. Generally, the described techniques allow a channel engineering device (CED) to identify a suitable configuration for deflecting uplink transmissions from a user equipment (UE) to a base station. The base station may transmit control signaling to the CED indicating multiple configurations for deflecting uplink reference signals. The UE may then transmit the uplink reference signals to the CED, and the CED may deflect the uplink reference signals using the indicated configurations. The base station may receive the uplink reference signals from the UE via the CED, and the base station may perform measurements on the uplink reference signals. The base station may then identify a configuration for the CED to use to deflect subsequent transmissions from the UE to the base station based on the measurements, and the base station may transmit an indication of the configuration to the CED.

30 Claims, 17 Drawing Sheets

UPLINK BEAM MANAGEMENT USING A CONFIGURABLE DEFLECTOR

FIELD OF TECHNOLOGY

The following relates to wireless communications, including uplink beam management using a configurable deflector.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may transmit uplink data and control information directly to a base station (e.g., using beamforming). In some cases, however, the path between the UE and the base station may be obstructed or blocked, and the likelihood that the base station receives an uplink transmission from the UE may be low.

SUMMARY

The described techniques relate to improved methods, systems, devices, and apparatuses that support uplink beam management using a configurable deflector. Generally, the described techniques allow a channel engineering device (CED) to identify a suitable configuration for deflecting uplink transmissions from a user equipment (UE) to a base station. The base station may transmit control signaling to the CED indicating multiple configurations for deflecting uplink reference signals from the UE. The UE may then transmit the uplink reference signals to the CED, and the CED may deflect the uplink reference signals using the indicated configurations. The base station may receive the uplink reference signals from the UE via the CED, and the base station may perform measurements on the uplink reference signals. The base station may then identify a configuration for the CED to use to deflect subsequent transmissions from the UE to the base station based on the measurements, and the base station may transmit an indication of the configuration to the CED.

A method of wireless communication at a channel engineering device is described. The method may include receiving, from a base station, control signaling indicating a set of configurations for deflecting a set of uplink reference signal transmissions received from a UE, deflecting each uplink reference signal transmission of the set of uplink reference signal transmissions according to a corresponding configuration of the set of configurations, and receiving, from the base station based on deflecting each uplink reference signal transmission from the UE, an indication of a configuration of the set of configurations for the channel engineering device to use to deflect subsequent transmissions from the UE to the base station.

An apparatus for wireless communication at a channel engineering device is described. The apparatus may include a processor, memory coupled with the processor, and instructions stored in the memory. The instructions may be executable by the processor to cause the apparatus to receive, from a base station, control signaling indicating a set of configurations for deflecting a set of uplink reference signal transmissions received from a UE, deflect each uplink reference signal transmission of the set of uplink reference signal transmissions according to a corresponding configuration of the set of configurations, and receive, from the base station based on deflecting each uplink reference signal transmission from the UE, an indication of a configuration of the set of configurations for the channel engineering device to use to deflect subsequent transmissions from the UE to the base station.

Another apparatus for wireless communication at a channel engineering device is described. The apparatus may include means for receiving, from a base station, control signaling indicating a set of configurations for deflecting a set of uplink reference signal transmissions received from a UE, deflecting each uplink reference signal transmission of the set of uplink reference signal transmissions according to a corresponding configuration of the set of configurations, and receiving, from the base station based on deflecting each uplink reference signal transmission from the UE, an indication of a configuration of the set of configurations for the channel engineering device to use to deflect subsequent transmissions from the UE to the base station.

A non-transitory computer-readable medium storing code for wireless communication at a channel engineering device is described. The code may include instructions executable by a processor to receive, from a base station, control signaling indicating a set of configurations for deflecting a set of uplink reference signal transmissions received from a UE, deflect each uplink reference signal transmission of the set of uplink reference signal transmissions according to a corresponding configuration of the set of configurations, and receive, from the base station based on deflecting each uplink reference signal transmission from the UE, an indication of a configuration of the set of configurations for the channel engineering device to use to deflect subsequent transmissions from the UE to the base station.

Some examples of the method, apparatuses, and non-transitory computer-readable medium described herein may further include operations, features, means, or instructions for receiving the set of uplink reference signal transmissions from the UE on a single beam, where deflecting each uplink reference signal transmission of the set of uplink reference signal transmissions according to a corresponding configuration of the set of configurations includes beam sweeping the set of uplink reference signal transmissions.

In some examples of the method, apparatuses, and non-transitory computer-readable medium described herein, receiving the set of uplink reference signal transmissions from the UE on the single beam may include operations, features, means, or instructions for receiving the set of uplink reference signal transmissions from the UE in consecutive symbols of a time duration indicated by the received control signaling. In some examples of the method, apparatuses, and non-transitory computer-readable medium described herein, receiving the set of uplink reference signal transmissions from the UE on the single beam may include operations, features, means, or instructions for receiving the set of uplink reference signal transmissions from the UE in non-consecutive symbols of a time duration indicated by the received control signaling.

In some examples of the method, apparatuses, and non-transitory computer-readable medium described herein, each of the set of configurations corresponds to a different angle at which the channel engineering device may be to deflect an uplink reference signal transmission. In some examples of the method, apparatuses, and non-transitory computer-readable medium described herein, the set of uplink reference signal transmissions includes a set of sounding reference signal transmissions. In some examples of the method, apparatuses, and non-transitory computer-readable medium described herein, the control signaling indicating the set of configurations includes indicates a set of settings to adjust an electronic metamaterial of the channel engineering device to focus received signal energy, reflect received signal energy, refract received signal energy, filter received signal energy, or any combination thereof.

A method of wireless communication at a base station is described. The method may include transmitting, to a channel engineering device, control signaling indicating a set of configurations for deflecting a set of uplink reference signal transmissions received from a UE, receiving each of the set of uplink reference signal transmissions according to a corresponding configuration of the set of configurations based on transmitting the control signaling indicating the set of configurations, and transmitting, to the channel engineering device based on receiving each of the set of uplink reference signal transmissions, an indication of a configuration of the set of configurations for the channel engineering device to use to deflect subsequent transmissions from the UE to the base station.

An apparatus for wireless communication at a base station is described. The apparatus may include a processor, memory coupled with the processor, and instructions stored in the memory. The instructions may be executable by the processor to cause the apparatus to transmit, to a channel engineering device, control signaling indicating a set of configurations for deflecting a set of uplink reference signal transmissions received from a UE, receive each of the set of uplink reference signal transmissions according to a corresponding configuration of the set of configurations based on transmitting the control signaling indicating the set of configurations, and transmit, to the channel engineering device based on receiving each of the set of uplink reference signal transmissions, an indication of a configuration of the set of configurations for the channel engineering device to use to deflect subsequent transmissions from the UE to the base station.

Another apparatus for wireless communication at a base station is described. The apparatus may include means for transmitting, to a channel engineering device, control signaling indicating a set of configurations for deflecting a set of uplink reference signal transmissions received from a UE, receiving each of the set of uplink reference signal transmissions according to a corresponding configuration of the set of configurations based on transmitting the control signaling indicating the set of configurations, and transmitting, to the channel engineering device based on receiving each of the set of uplink reference signal transmissions, an indication of a configuration of the set of configurations for the channel engineering device to use to deflect subsequent transmissions from the UE to the base station.

A non-transitory computer-readable medium storing code for wireless communication at a base station is described. The code may include instructions executable by a processor to transmit, to a channel engineering device, control signaling indicating a set of configurations for deflecting a set of uplink reference signal transmissions received from a UE, receive each of the set of uplink reference signal transmissions according to a corresponding configuration of the set of configurations based on transmitting the control signaling indicating the set of configurations, and transmit, to the channel engineering device based on receiving each of the set of uplink reference signal transmissions, an indication of a configuration of the set of configurations for the channel engineering device to use to deflect subsequent transmissions from the UE to the base station.

Some examples of the method, apparatuses, and non-transitory computer-readable medium described herein may further include operations, features, means, or instructions for performing measurements on each of the set of uplink reference signal transmissions received at the base station, and selecting the configuration of the set of configurations for the channel engineering device to use to deflect subsequent transmissions from the UE to the base station based on the measurements, where transmitting the indication of the configuration of the set of configurations may be based on the selecting. In some examples of the method, apparatuses, and non-transitory computer-readable medium described herein, the measurements include signal quality measurements, signal direction measurements, or a combination thereof.

In some examples of the method, apparatuses, and non-transitory computer-readable medium described herein, receiving each of the set of uplink reference signal transmissions according to the corresponding configuration of the set of configurations may include operations, features, means, or instructions for receiving the set of uplink reference signal transmissions using a beam sweep. In some examples of the method, apparatuses, and non-transitory computer-readable medium described herein, receiving each of the set of uplink reference signal transmissions may include operations, features, means, or instructions for receiving the set of uplink reference signal transmissions in consecutive symbols of a time duration indicated by the control signaling. In some examples of the method, apparatuses, and non-transitory computer-readable medium described herein, receiving each of the set of uplink reference signal transmissions may include operations, features, means, or instructions for receiving the set of uplink reference signal transmissions in non-consecutive symbols of a time duration indicated by the received control signaling.

In some examples of the method, apparatuses, and non-transitory computer-readable medium described herein, the set of uplink reference signal transmissions includes a set of sounding reference signal transmissions. Some examples of the method, apparatuses, and non-transitory computer-readable medium described herein may further include operations, features, means, or instructions for establishing a communication link with the channel engineering device, and receiving, from the channel engineering device, an indication of a set of potential configurations of the channel engineering device, the control signaling transmitted based on the set of potential configurations. In some examples of the method, apparatuses, and non-transitory computer-readable medium described herein, the control signaling indicating the set of configurations includes indicates a set of settings to adjust an electronic metamaterial of the channel engineering device to focus received signal energy, reflect received signal energy, refract received signal energy, filter received signal energy, or any combination thereof.

DETAILED DESCRIPTION

Figure 1:
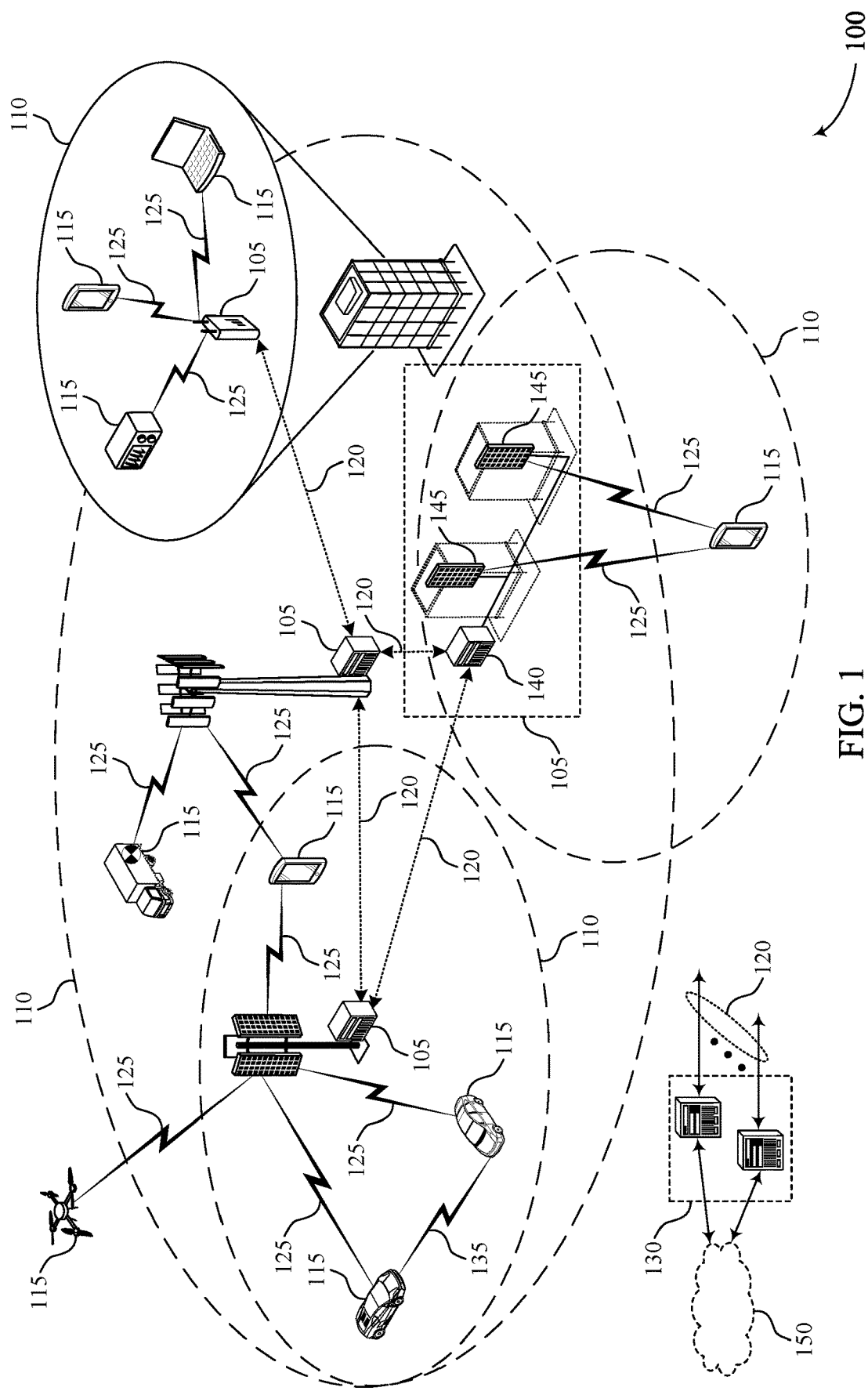
FIG. 1 illustrates an example of a wireless communications system that supports uplink beam management using a configurable deflector in accordance with aspects of the present disclosure.

Some wireless communications systems may support communications between a user equipment (UE) and a base station via a channel engineering device (CED). In particular, the UE may transmit uplink signals to the CED to be deflected to the base station. The CED may deflect the uplink signals to the base station such that the base station may reliably receive the uplink signals from the UE (e.g., even when there is an obstruction in the path between the UE and the base station). In such systems, it may be appropriate for the CED to identify a suitable configuration for deflecting uplink signals to the base station. However, some wireless communications systems may simply support techniques at a UE and a base station for identifying suitable configurations for communications directly between the UE and the base station.

In one aspect, a wireless communications system may support an uplink beam management procedure where a UE transmits multiple uplink reference signal transmissions on multiple transmit beams, and the base station indicates which of the transmit beam the UE is to use for subsequent transmissions to the UE. In another aspect, the wireless communications system may support an uplink beam management procedure where a UE transmits multiple uplink reference signal transmissions on a single transmit beam, and the base station may receive the uplink reference signal transmissions on different receive beams to identify which of the receive beams to use to receive subsequent uplink transmissions from the UE. The above beam management procedures may allow a UE and a base station to identify suitable configurations for communicating directly with each other. However, these beam management procedures may not involve a CED. As a result, the CED may be unable to identify a suitable configuration for deflecting uplink transmissions from the UE to the base station.

As described herein, a wireless communications system may support efficient techniques for allowing a CED to identify a suitable configuration for deflecting uplink transmissions from a UE to a base station. The base station may transmit control signaling to the CED indicating multiple configurations for deflecting uplink reference signals from the UE. Alternatively, the CED may identify the multiple configurations for deflecting uplink reference signals from the UE without control signaling from the base station (e.g., autonomously). The UE may then transmit the uplink reference signals to the CED, and the CED may deflect the uplink reference signals using the indicated configurations. The base station may receive the uplink reference signals from the UE via the CED, and the base station may perform measurements on the uplink reference signals. The base station may then identify a configuration for the CED to use to deflect subsequent transmissions from the UE to the base station based on the measurements, and the base station may transmit an indication of the configuration to the CED.

Aspects of the disclosure introduced above are described below in the context of a wireless communications system. Examples of processes and signaling exchanges that support uplink beam management using a configurable deflector are then described. Aspects of the disclosure are further illustrated by and described with reference to apparatus diagrams, system diagrams, and flowcharts that relate to uplink beam management using a configurable deflector.

FIG. 1 illustrates an example of a wireless communications system 100 that supports uplink beam management using a configurable deflector in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may support communications between a UE 115 and a base station 105 via a CED. In particular, the UE 115 may transmit uplink signals to the CED, and the CED may deflect the uplink signals to the base station 105. In some cases, a CED may be an example of a UE 115 in wireless communications system 100. In wireless communications system, the coverage of a base station 105 may be limited to line of sight (LOS) and specular deflections (e.g., reflections or refractions). Thus, adding specular deflectors (e.g., reflectors or refractors) may extend the coverage of base stations 105 to areas which may otherwise be uncovered. Both reflectors and refractors may also have a focusing energy or concentration effect to further enhance the link between a UE 115 and a base station 105. Metamaterials may be used to construct CEDs, and a base station 105 may configure the CEDs periodically to enhance coverage.

Figure 2:
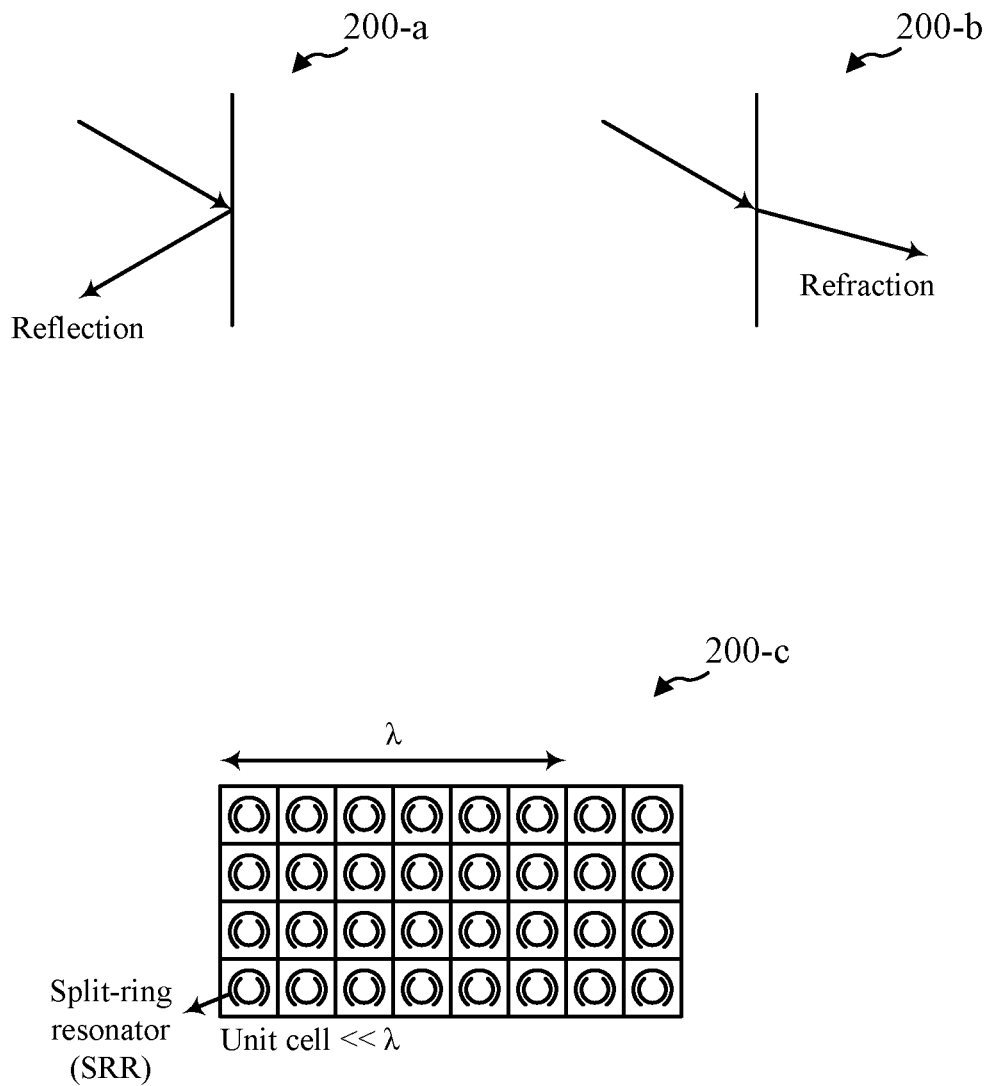
FIG. 2 illustrates examples of channel engineering devices (CEDs) in accordance with aspects of the present disclosure.

FIG. 2 illustrates examples of CEDs 200 in accordance with aspects of the present disclosure. In a first example 200-$a$, a UE 115 may transmit uplink signals to a CED, and the CED may reflect the uplink signals to a base station 105. In a second example 200-$b$, a UE 115 may transmit uplink signals to a CED, and the CED may refract the uplink signals to a base station 105. The third example 200-$c$ shows one possible design of a CED. The CED may be made up of an electromagnetic metamaterial that affects waves that impinge on or interact with its structural features, which are smaller than the wavelength. To behave as a homogenous material accurately described by an effective refractive index, its features may be organized as unit cells that may be much smaller than the wavelength ($\lambda$) of the downlink signals (or other signals intended to be reflected, refracted, or otherwise redirected by the CED). The CED may include an array of unit cells. In one example, each unit cell is a split-ring resonator (SRR). For example the SRR may be a pair of concentric metallic rings, formed on a dielectric substrate, with slits on opposite sides of the rings. However, any configuration of CED may be used consistent with the techniques described herein. Different use cases for the CED are illustrated in further detail in FIGS. 3-5.

Figure 3:
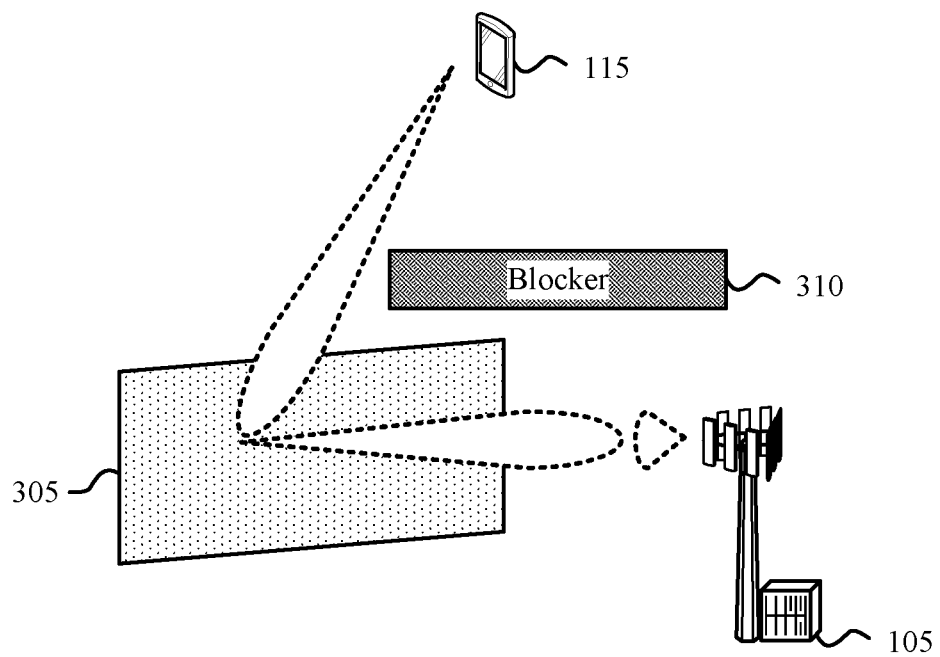
FIG. 3 illustrates an example of reflecting uplink transmissions from a user equipment (UE) to a base station in accordance with aspects of the present disclosure.

FIG. 3 illustrates an example of reflecting uplink transmissions 300 from a UE 115 to a base station 105 in accordance with aspects of the present disclosure. Because the direct path between the UE 115 and the base station 105 may be obstructed by a blocker 310, the UE 115 may transmit the uplink transmissions to the CED 305, and the CED 305 may reflect the uplink transmissions to the base station 105.

Figure 4:
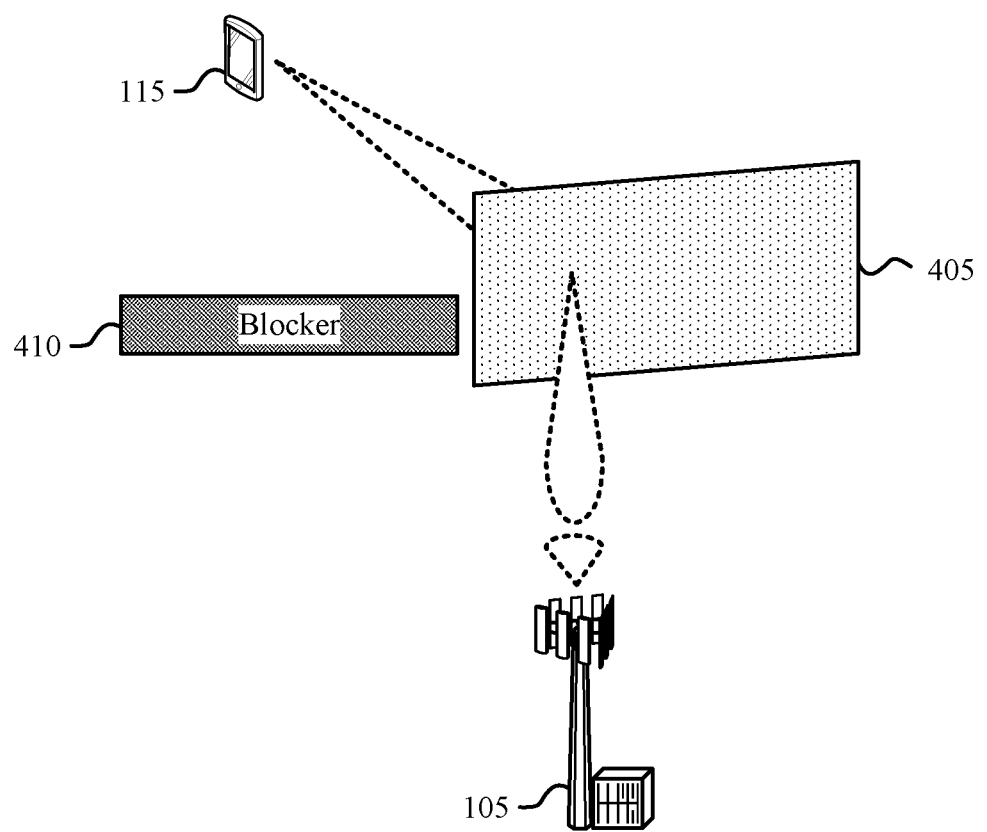
FIG. 4 illustrates an example of refracting uplink transmissions from a UE to a base station in accordance with aspects of the present disclosure.

FIG. 4 illustrates an example of refracting uplink transmissions 400 from a UE 115 to a base station 105 in accordance with aspects of the present disclosure. Because the direct path between the UE 115 and the base station 105 may be obstructed by a blocker 410, the UE 115 may transmit the uplink transmissions to the CED 405, and the CED may refract the uplink transmissions to the base station 105.

Figure 5:
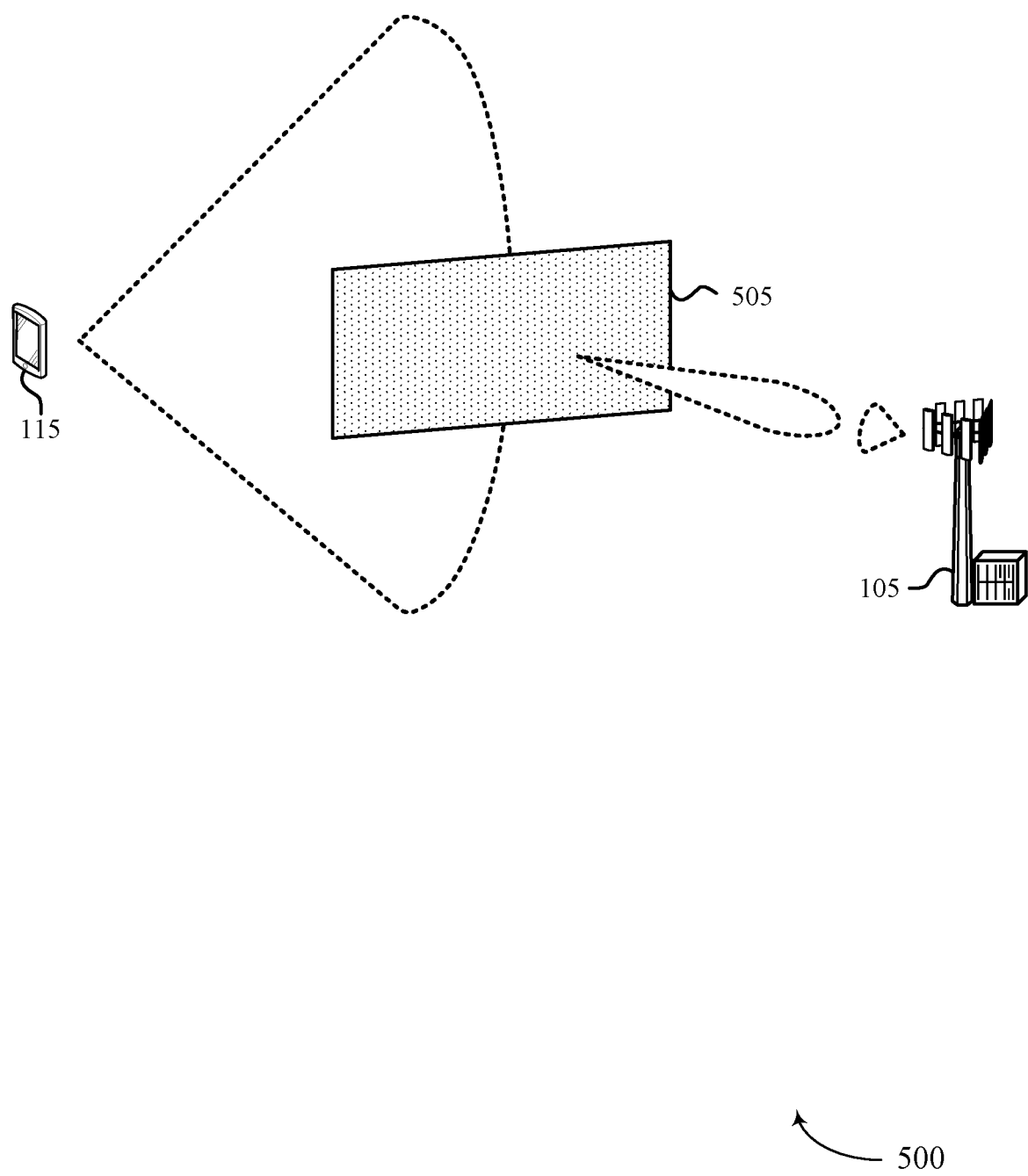
FIG. 5 illustrates an example of focusing downlink transmissions from a UE to a base station in accordance with aspects of the present disclosure.

FIG. 5 illustrates an example of focusing uplink transmissions 500 from a UE 115 to a base station 105 in accordance with aspects of the present disclosure. Because a beam used by the UE 115 for an uplink transmission may be wide, the CED 505 may receive the uplink transmission and deflect the uplink transmission to the base station 105 using a focused beam to improve the chances that the uplink transmission is received by the base station 105.

In one aspect, a wireless communications system may support a first uplink beam management procedure to allow a UE 115 to identify a transmit beam for transmitting uplink transmissions to a base station 105. In this aspect, the UE 115 may transmit multiple uplink reference signal transmissions (e.g., sounding reference signal (SRS) transmissions) on multiple transmit beams, and the base station 105 may receive the uplink reference signal transmissions and perform measurements on the uplink reference signal transmissions. The base station 105 may then identify a transmit beam at the UE 115 associated with the best measurements, and the base station 105 may transmit an indication of the transmit beam to the UE 115 for the UE 115 to use for subsequent uplink transmissions to the base station 105. The measurements may include signal quality measurements (e.g., reference signal received power (RSRP) measurements, reference signal received quality (RSRQ) measurements, or signal-to-interference-plus-noise ratio (SINR) measurements) or signal direction measurements. (e.g., measurements of the angle, zenith, etc.). Further, the best measurements may correspond to the highest signal quality measurements (e.g., highest RSRP, RSRQ, or SINR).

In another aspect, a wireless communications system may support a second uplink beam management procedure to allow a base station 105 to identify a receive beam for receiving uplink transmissions from a UE 115. In this aspect, the UE 115 may transmit multiple uplink reference signal transmissions on a same transmit beam, and the base station 105 may receive the uplink reference signal transmissions on different receive beams and perform measurements on the uplink reference signal transmissions. For instance, the UE 115 may transmit SRSs with repetition, and the base station 105 may use this repetition for beam refinement or UE tracking by sweeping base station receive beam during the SRS repetition period. The base station 105 may then identify a receive beam associated with the best measurements (e.g., highest signal quality measurements) to use to receive subsequent uplink transmissions from the UE 115.

In yet another aspect, a wireless communications system may support downlink beam management procedures to allow a base station 105 to identify a transmit beam for transmitting downlink transmissions to a UE 115 and to allow the UE 115 to identify a receive beam for receiving downlink transmissions from the base station 105. Then, the UE 115 and the base station 105 may be configured to perform uplink beam selection based on downlink and uplink reciprocity (e.g., uplink transmit beam selection may rely on downlink and uplink reciprocity). In particular, the UE 115 may use a transmit beam reciprocal to the receive beam identified in the downlink beam management procedure to transmit uplink transmissions to the base station 105. Similarly, the base station 105 may use a receive beam reciprocal to the transmit beam identified in the downlink beam management procedure to receive uplink transmissions from the UE 115.

The above beam management procedures may allow a UE 115 and a base station 105 to identify suitable configurations for communicating directly with each other. However, these beam management procedures may not involve a CED. As a result, the CED may be unable to identify a suitable configuration for deflecting uplink transmissions from the UE 115 to the base station 105. Wireless communications system 100 may support efficient techniques for allowing a CED to identify a suitable configuration for deflecting uplink transmissions from a UE 115 to a base station 105. Specifically, wireless communications system 100 may introduce a beam management procedure for tracking UE transmit beams or different configurations at a CED when using a CED (e.g., based on a CED beam sweep which may extend the coverage of a base station 105 and potentially offload some beam management procedures to the base station 105).

Figure 6:
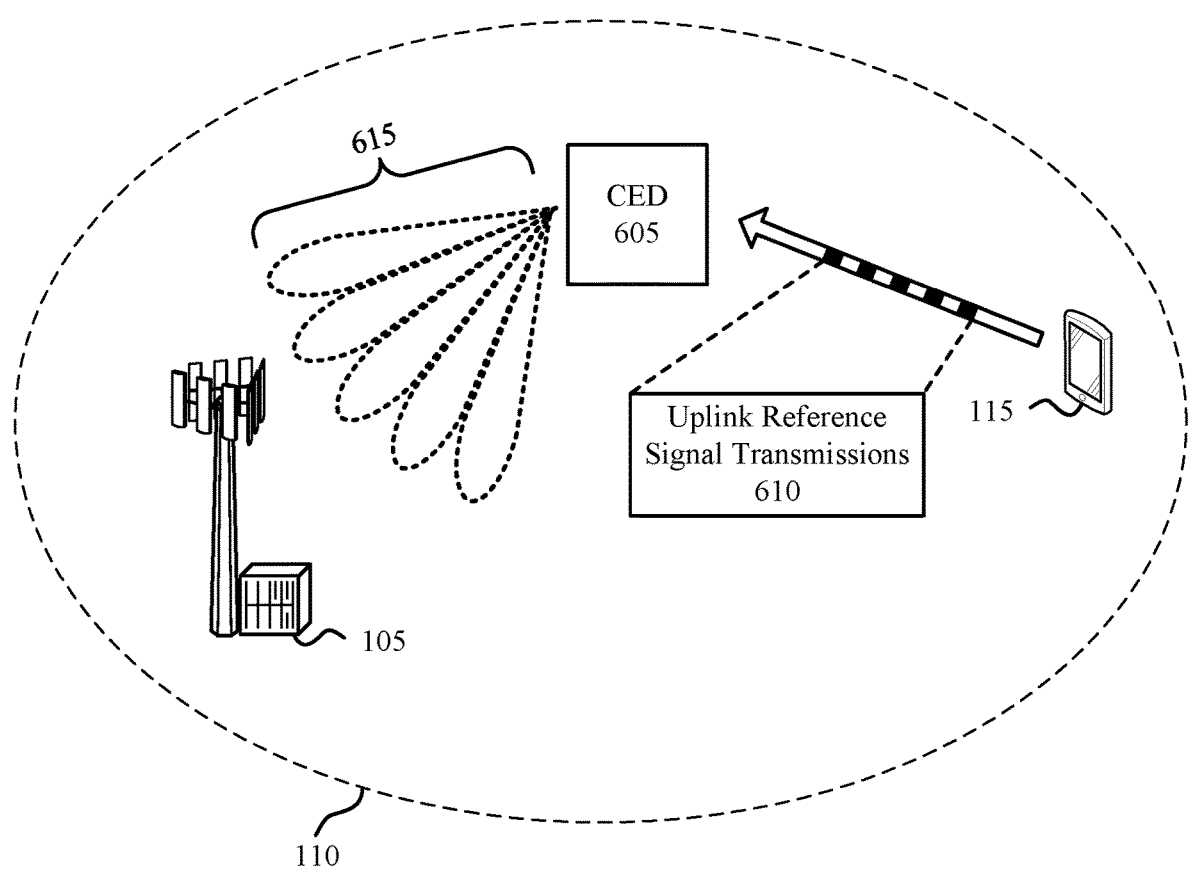
FIG. 6 illustrates an example of a wireless communications system that supports uplink beam management using a configurable deflector in accordance with aspects of the present disclosure.

FIG. 6 illustrates an example of a wireless communications system 600 that supports uplink beam management using a configurable deflector in accordance with aspects of the present disclosure. The wireless communications system 600 includes a UE 115, which may be an example of a UE 115 described with reference to FIGS. 1-5. The wireless communications system 600 also includes a CED 605, which may be an example of a CED described with reference to FIGS. 1-5. The wireless communications system 600 also includes a base station 105, which may be an example of a base station 105 described with reference to FIGS. 1-5. The base station 105 may provide communication coverage to one or more UEs 115 in a coverage area 110. The wireless communications system 600 may implement aspects of wireless communications system 100. For example, the wireless communications system 600 may support efficient techniques for allowing the CED 605 to identify a suitable configuration for deflecting uplink transmissions from the UE 115 to the base station 105.

In the example of FIG. 6, the base station 105 may transmit an indication of multiple configurations 615 for the CED 605 to use to deflect uplink reference signal transmissions 610. Each configuration may correspond to an angle, power, etc. for the CED 605 to use to deflect an uplink reference signal transmission. Thus, the base station 105 may configure the CED 605 to have different deflection (e.g., reflection or refraction) angles for each uplink reference signal transmission (e.g., SRS repetition symbol).

The UE 115 may then transmit multiple uplink reference signal transmissions 610 to the CED 605, and the CED 605 may deflect the uplink reference signal transmissions using the configurations 615. That is, the UE 115 may be configured to transmit uplink reference signal transmissions (e.g., SRS transmissions) with repetition (e.g., for N symbols). Because the CED 605 may deflect the uplink reference signals using different configurations 615, the UE 115 may transmit the uplink reference signals to the CED 605 using a same transmit beam. The UE 115 may select the transmit beam to use to transmit the uplink reference signal transmissions to the CED 605 when the UE 115 first connects to the CED 605, and the UE 115 may update the transmit beam if a location of the UE 115 changes.

The base station 105 may receive the uplink reference signal transmissions deflected using the configurations 615. Because the CED 605 may deflect the uplink reference signals using the different configurations 615, the base station 105 may see different beam angles for each uplink reference signal transmission (e.g., on each SRS resource), even though the UE 115 may transmit the uplink reference signal transmissions to the CED 605 on the same transmit beam (e.g., even though the UE 115 used repetition to transmit the uplink reference signal transmissions).

The base station 105 may then perform measurements on each of the uplink reference signal transmissions (e.g., measure the received beam quality of each SRS resource), and the base station 105 may identify an uplink reference signal transmission (e.g., choose the best deflection) with the best measurements (e.g., highest signal quality measurements). The base station 105 may then transmit an indication to the CED of the configuration that the CED 605 is to use to deflect subsequent transmissions to the base station 105 (e.g., a configuration corresponding to the uplink reference signal transmission with the best measurements). That is, the best deflection may be configured back to the CED 605 as the serving deflection. Because the CED 605 may use a configuration associated with the best measurements to transmit subsequent transmissions to the base station 105, the throughput in wireless communications system 600 may be improved, and the coverage of the base station 105 may be enhanced.

In some aspects, in addition to deflecting uplink reference signal transmissions using different configurations 615, the CED 605 may deflect uplink reference signal transmissions using a single configuration. In such aspects, the UE 115 may transmit multiple uplink reference signal transmissions to the CED 605, and the CED 605 may deflect the uplink reference signal transmissions using a same configuration (e.g., best configuration as selected using the techniques described above). The base station 105 may receive each of the uplink reference signal transmissions using a different receive beam, and the base station 105 may perform measurements on each of the uplink reference signal transmissions. The base station 105 may then identify an uplink reference signal transmission with the best measurements, and the base station 105 may select a receive beam used to receive the uplink reference signal transmission with the best measurements to receive subsequent transmissions from the CED 605.

Figure 7:
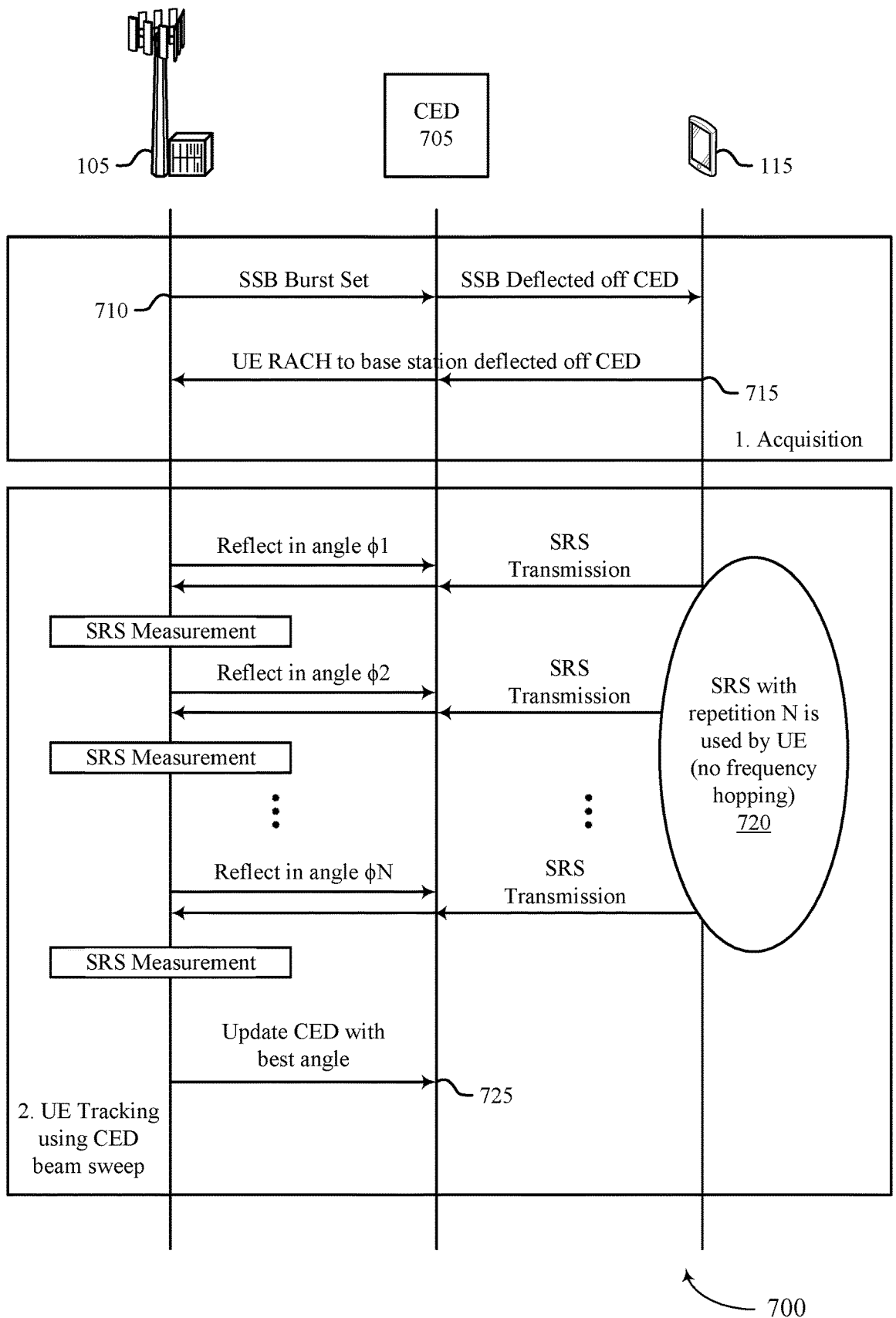
FIG. 7 illustrates an example of a process flow that supports uplink beam management using a configurable deflector in accordance with aspects of the present disclosure.

FIG. 7 illustrates an example of a process flow 700 that supports uplink beam management using a configurable deflector in accordance with aspects of the present disclosure. Process flow 700 illustrates aspects of techniques performed by a UE 115, which may be an example of a UE 115 described with reference to FIGS. 1-6. Process flow 700 also illustrates aspects of techniques performed by a CED 705, which may be an example of a CED described with reference to FIGS. 1-6. Process flow 700 also illustrates aspects of techniques performed by a base station 105, which may be an example of a base station 105 described with reference to FIGS. 1-6. Process flow 700 may implement aspects of wireless communications system 600. For example, the process flow 700 may support efficient techniques for allowing the CED 705 to identify a suitable configuration for deflecting uplink transmissions from the UE 115 to the base station 105.

In the following description of the process flow 700, the operations between the base station 105, the CED 705, and the UE 115 may be transmitted in a different order than the example order shown, or the operations performed by the base station 105, the CED 705, and the UE 115 may be performed in different orders or at different times. Some operations may also be omitted from the process flow 700, and other operations may be added to the process flow 700. Further, although operations in the process flow 700 may be divided into an acquisition group and a UE tracking group, it is to be understood that these groups are illustrated for explanation purposes, and the process flow may not be restricted to any number of operations in any number of groups.

At 710, the base station 105 may transmit a synchronization signal block (SSB) burst set, and the CED 705 may deflect the SSB burst set to the UE 115. The base station 105 may transmit SSB burst sets to broadcast downlink beams at the base station 105, and the CED 705 may deflect the SSB sets according to preconfigured angles. The UE 115 may select a best SSB (e.g., base station downlink beam or beam pair link), and, at 715, the UE 115 may establish a connection with the base station 105. For instance, the UE may perform a random-access channel (RACH) procedure to establish the connection with the base station 105. As part of the RACH procedure, the UE 115 may transmit one or more RACH messages to the CED 705, and the CED 705 may deflect the one or more RACH messages to the base station 105.

Once the UE 115 is connected to the base station 105, the base station 105 may transmit, and the CED may receive, control signaling indicating a set of configurations for deflecting SRS transmissions received from the UE 115. In some cases, each configuration in the set of configurations may correspond to a different angle at which the CED 705 is to deflect an SRS transmission. Further, the control signaling may include multiple settings to adjust an electronic metamaterial of the CED 705 to focus received signal energy, reflect received signal energy, refract received signal energy, or filter received signal energy. In some cases, the CED 705 may also transmit, and the base station 105 may receive, an indication of a set of potential configurations of the CED 705. In such cases, the base station 105 may select the set of configurations indicated in the control signaling based on the set of potential configurations of the CED 705.

At 720, the UE 115 may transmit a set of SRS transmissions (e.g., each on a different SRS resource) to the CED 705, and the CED 705 may receive the set of SRS transmissions. The UE 115 may transmit, and the CED 705 may receive, the set of SRS transmissions on a single beam. Further, the UE 115 may transmit, and the CED 705 may receive, the set of SRS transmissions in consecutive symbols or non-consecutive symbols. The CED 705 may then deflect each SRS transmission of the set of SRS transmissions according to a corresponding configuration of the set of configurations. Because each configuration may be associated with an SRS resource (e.g., symbol), the CED 705 may be able to identify the configuration to use to deflect an SRS transmission received in each SRS resource (e.g., symbol).

The base station 105 may receive the set of SRS transmissions from the UE 115 each deflected by the CED 705 using a corresponding configuration of the set of configurations. The base station 105 may then perform measurements on each of the set of SRS transmissions (e.g., signal quality measurements and signal direction measurements), and the base station 105 may identify an SRS transmission associated with the best measurements. The base station 105 may then identify a configuration corresponding to the SRS transmission, and the base station 105 may determine that the identified configuration is a best configuration for the CED 705 to use to deflect subsequent uplink transmissions from the UE 115 to the base station 105. Accordingly, at 725, the base station 105 may transmit, and the CED 705 may receive, an indication of the identified configuration for the CED 705 to use to deflect subsequent transmissions from the UE 115 to the base station 105. That is, the base station 105 may update the CED 705 with the best angle for deflecting uplink transmissions from the UE 115 to the base station 105.

Figure 8:
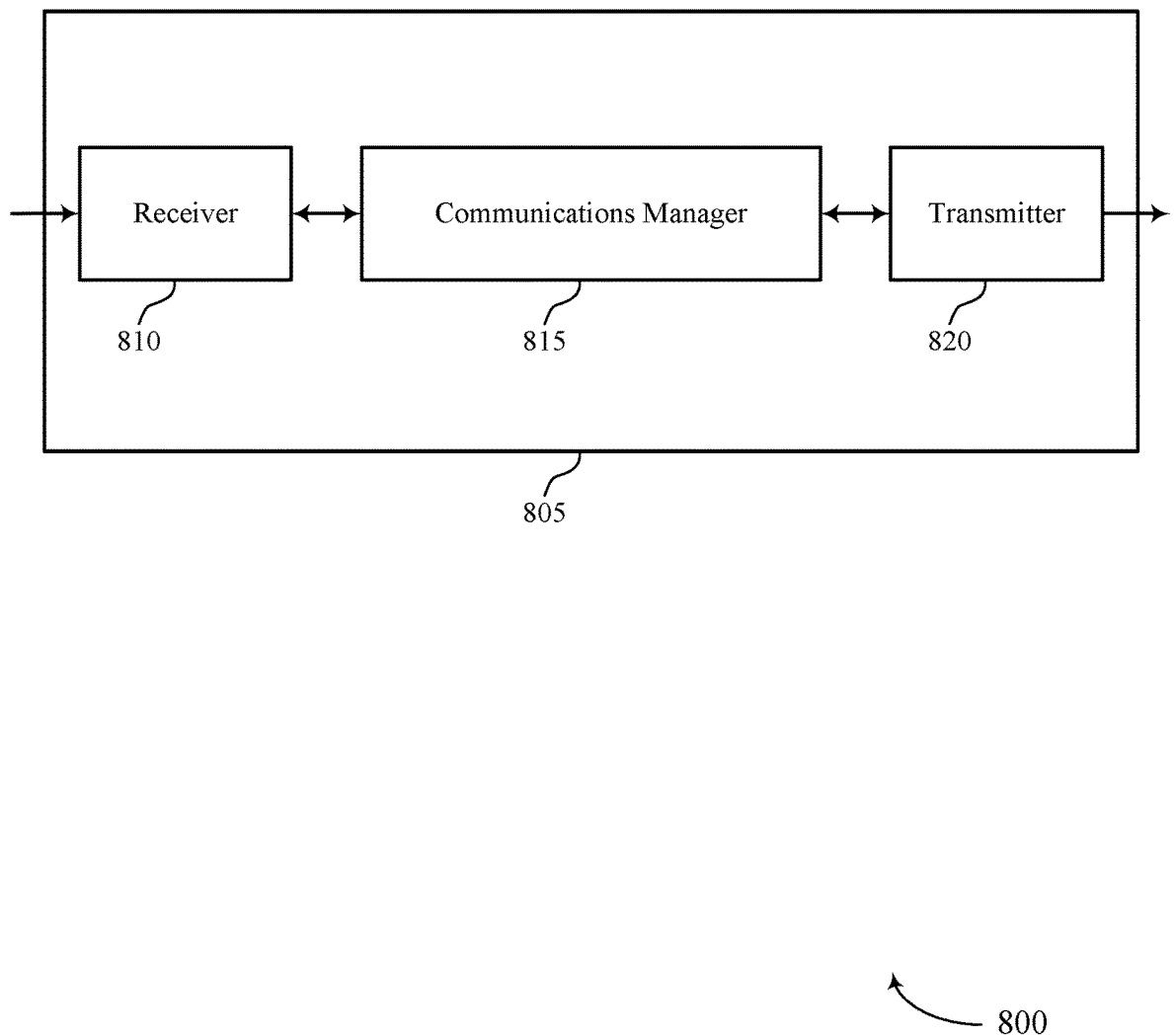
FIGS. 8 and 9 show block diagrams of devices that support uplink beam management using a configurable deflector in accordance with aspects of the present disclosure.

FIG. 8 shows a block diagram 800 of a channel engineering device 805 that supports uplink beam management using a configurable deflector in accordance with aspects of the present disclosure. The channel engineering device 805 may be an example of aspects of a channel engineering device as described herein. The channel engineering device 805 may include a receiver 810, a communications manager 815, and a transmitter 820. The channel engineering device 805 may also include a processor. Each of these components may be in communication with one another (e.g., via one or more buses).

The receiver 810 may receive information such as packets, user data, or control information associated with various information channels (e.g., control channels, data channels, and information related to uplink beam management using a configurable deflector, etc.). Information may be passed on to other components of the channel engineering device 805. The receiver 810 may be an example of aspects of the transceiver 1120 described with reference to FIG. 11. The receiver 810 may utilize a single antenna or a set of antennas.

The communications manager 815 may receive, from a base station, control signaling indicating a set of configurations for deflecting a set of uplink reference signal transmissions received from a UE, deflect each uplink reference signal transmission of the set of uplink reference signal transmissions according to a corresponding configuration of the set of configurations, and receive, from the base station based on deflecting each uplink reference signal transmission from the UE, an indication of a configuration of the set of configurations for the channel engineering device to use to deflect subsequent transmissions from the UE to the base station. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the channel engineering device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
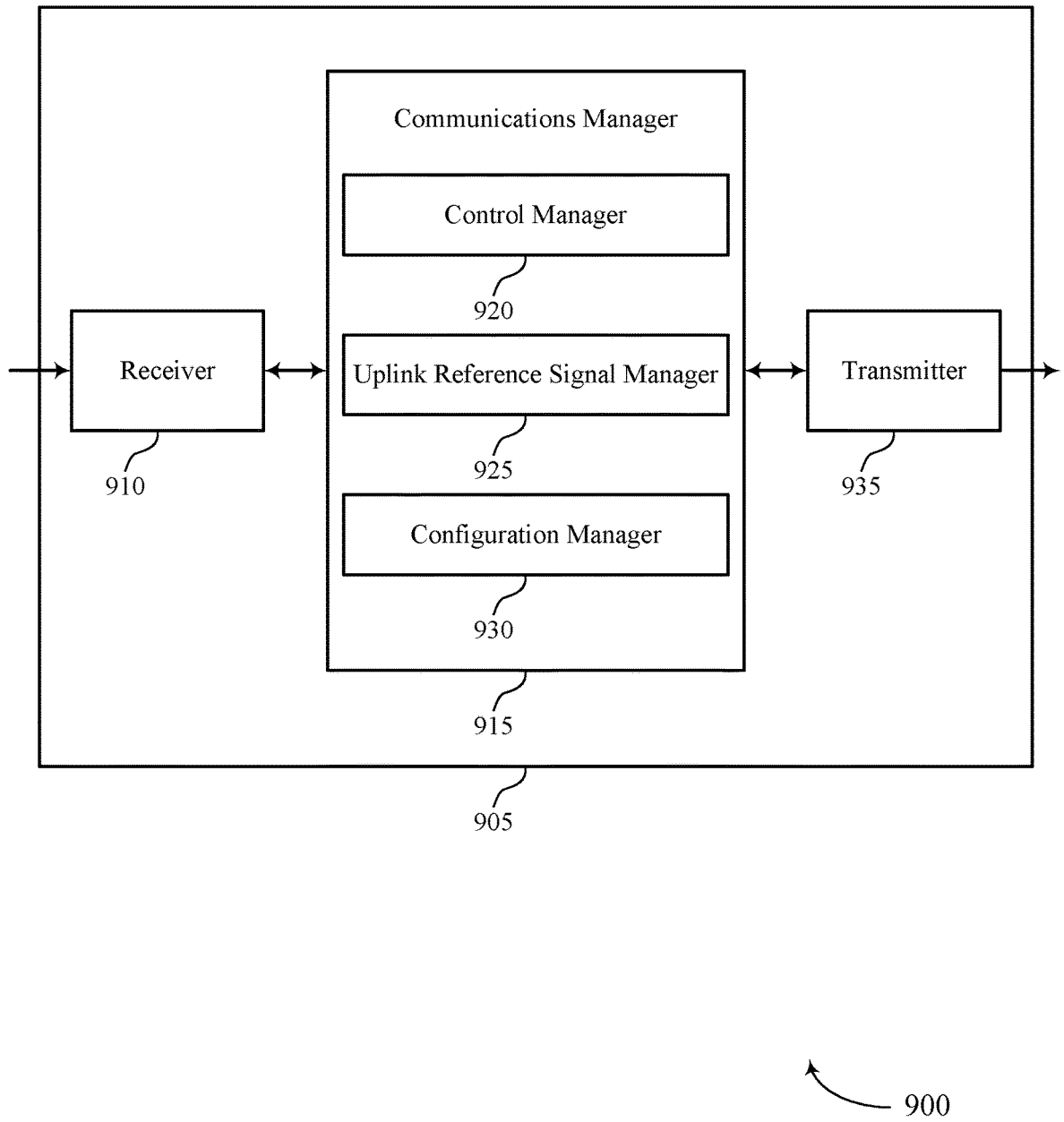

FIG. 9 shows a block diagram 900 of a channel engineering device 905 that supports uplink beam management using a configurable deflector in accordance with aspects of the present disclosure. The channel engineering device 905 may be an example of aspects of a channel engineering device 805, or a UE 115 as described herein. The channel engineering device 905 may include a receiver 910, a communications manager 915, and a transmitter 935. The channel engineering device 905 may also include a processor. Each of these components may be in communication with one another (e.g., via one or more buses).

The receiver 910 may receive information such as packets, user data, or control information associated with various information channels (e.g., control channels, data channels, and information related to uplink beam management using a configurable deflector, etc.). Information may be passed on to other components of the channel engineering device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control manager 920, an uplink reference signal manager 925, and a configuration manager 930. The communications manager 915 may be an example of aspects of the communications manager 1110 described herein.

The control manager 920 may receive, from a base station, control signaling indicating a set of configurations for deflecting a set of uplink reference signal transmissions received from a UE. The uplink reference signal manager 925 may deflect each uplink reference signal transmission of the set of uplink reference signal transmissions according to a corresponding configuration of the set of configurations. The configuration manager 930 may receive, from the base station based on deflecting each uplink reference signal transmission from the UE, an indication of a configuration of the set of configurations for the channel engineering device to use to deflect subsequent transmissions from the UE to the base station.

The transmitter 935 may transmit signals generated by other components of the channel engineering device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
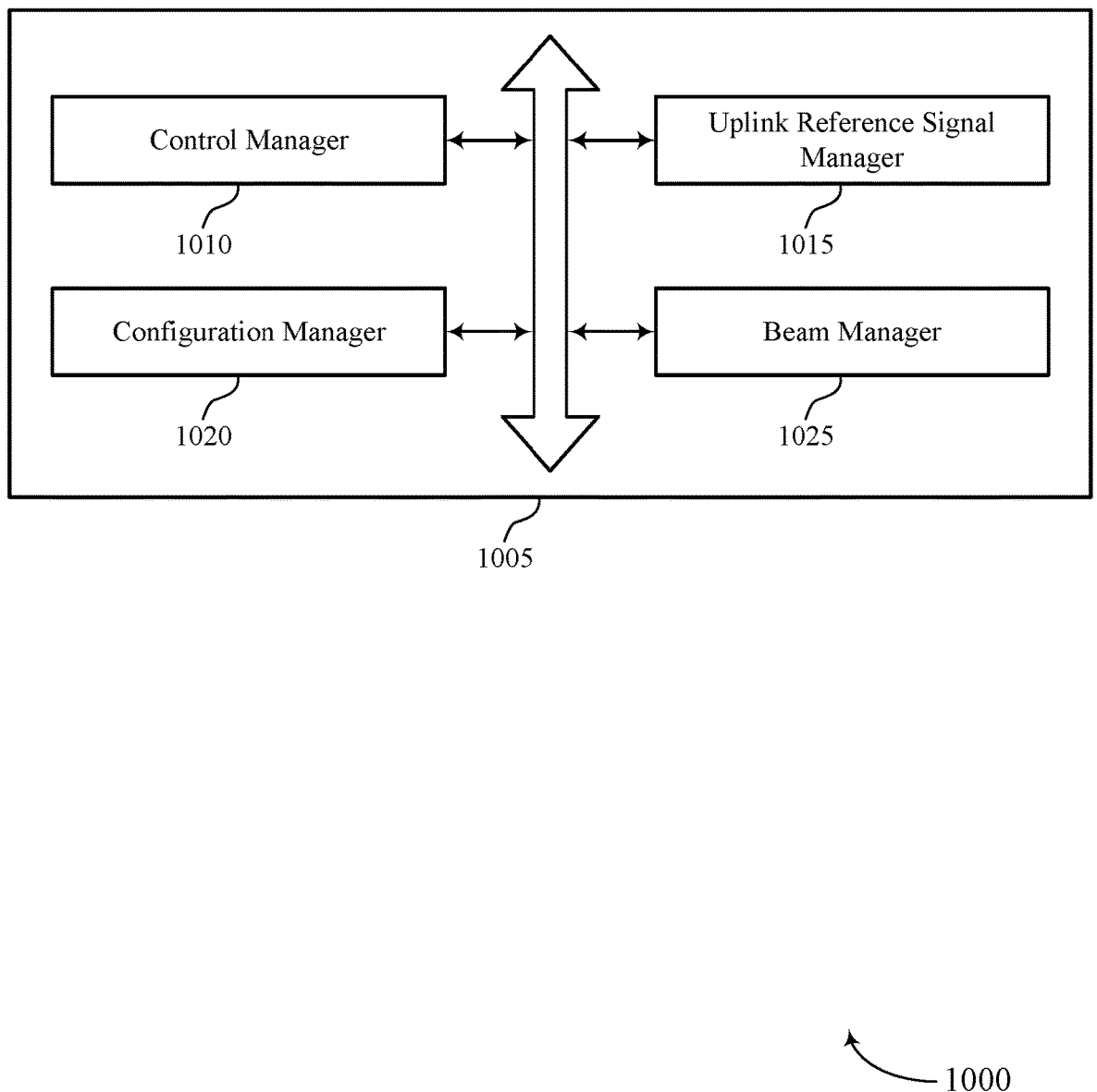
FIG. 10 shows a block diagram of a communications manager that supports uplink beam management using a configurable deflector in accordance with aspects of the present disclosure.

FIG. 10 shows a block diagram 1000 of a communications manager 1005 that supports uplink beam management using a configurable deflector in accordance with aspects of the present disclosure. The communications manager 1005 may be an example of aspects of a communications manager 815, a communications manager 915, or a communications manager 1110 described herein. The communications manager 1005 may include a control manager 1010, an uplink reference signal manager 1015, a configuration manager 1020, and a beam manager 1025. Each of these modules may communicate, directly or indirectly, with one another (e.g., via one or more buses).

The control manager 1010 may receive, from a base station, control signaling indicating a set of configurations for deflecting a set of uplink reference signal transmissions received from a UE. The uplink reference signal manager 1015 may deflect each uplink reference signal transmission of the set of uplink reference signal transmissions according to a corresponding configuration of the set of configurations. The configuration manager 1020 may receive, from the base station based on deflecting each uplink reference signal transmission from the UE, an indication of a configuration of the set of configurations for the channel engineering device to use to deflect subsequent transmissions from the UE to the base station.

The beam manager 1025 may receive the set of uplink reference signal transmissions from the UE on a single beam, where deflecting each uplink reference signal transmission of the set of uplink reference signal transmissions according to a corresponding configuration of the set of configurations includes beam sweeping the set of uplink reference signal transmissions. In some examples, the uplink reference signal manager 1015 may receive the set of uplink reference signal transmissions from the UE in consecutive symbols of a time duration indicated by the received control signaling. In some examples, the uplink reference signal manager 1015 may receive the set of uplink reference signal transmissions from the UE in non-consecutive symbols of a time duration indicated by the received control signaling.

In some cases, each of the set of configurations corresponds to a different angle at which the channel engineering device is to deflect an uplink reference signal transmission. In some cases, the set of uplink reference signal transmissions includes a set of sounding reference signal transmissions. In some cases, the control signaling indicating the set of configurations includes indicates a set of settings to adjust an electronic metamaterial of the channel engineering device to focus received signal energy, reflect received signal energy, refract received signal energy, filter received signal energy, or any combination thereof.

Figure 11:
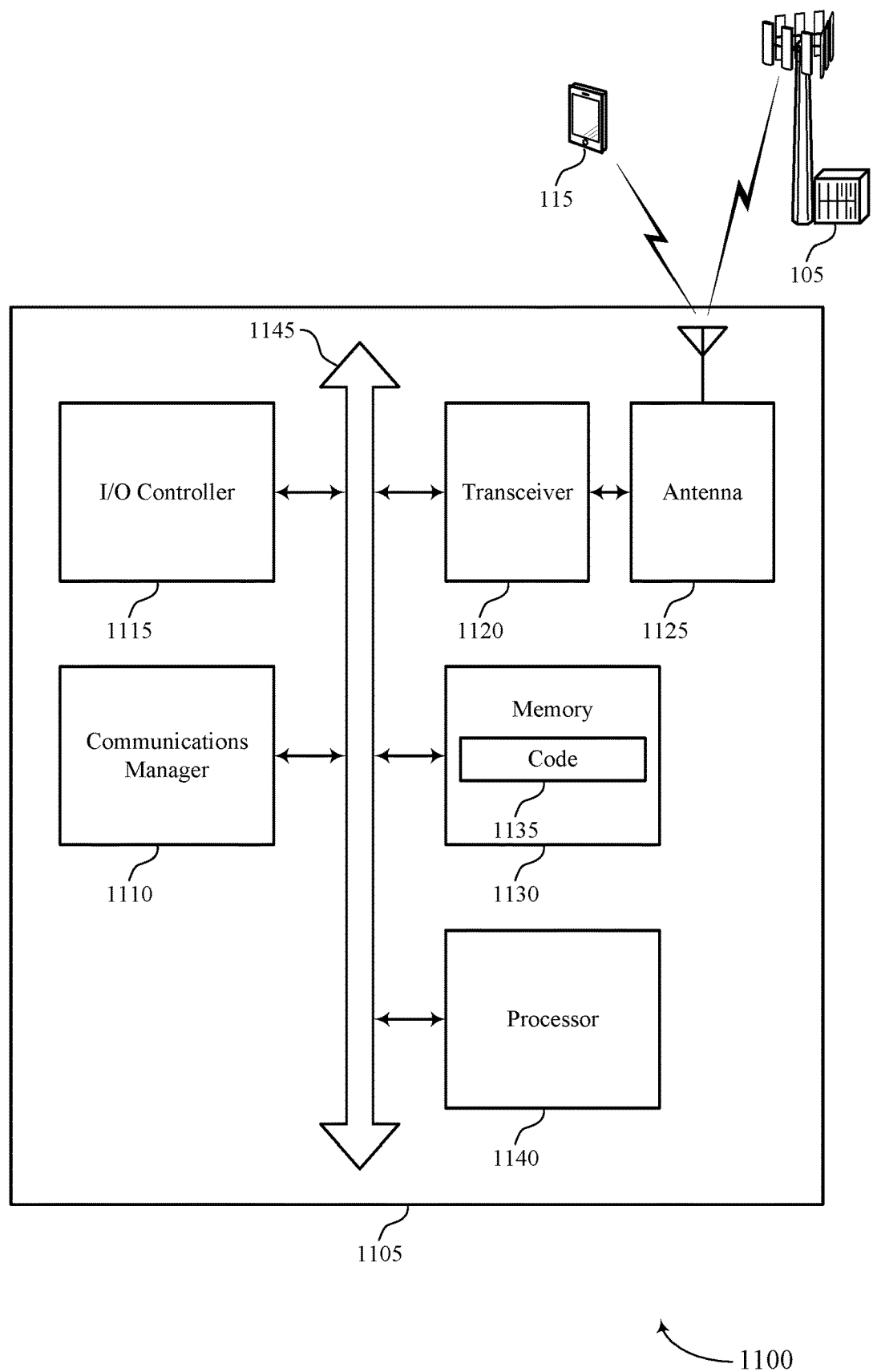
FIG. 11 shows a diagram of a system including a device that supports uplink beam management using a configurable deflector in accordance with aspects of the present disclosure.

FIG. 11 shows a diagram of a system 1100 including a channel engineering device 1105 that supports uplink beam management using a configurable deflector in accordance with aspects of the present disclosure. The channel engineering device 1105 may be an example of or include the components of channel engineering device 805, channel engineering device 905, or a UE 115 as described herein. The channel engineering device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, control signaling indicating a set of configurations for deflecting a set of uplink reference signal transmissions received from a UE, deflect each uplink reference signal transmission of the set of uplink reference signal transmissions according to a corresponding configuration of the set of configurations, and receive, from the base station based on deflecting each uplink reference signal transmission from the UE, an indication of a configuration of the set of configurations for the channel engineering device to use to deflect subsequent transmissions from the UE to the base station.

The I/O controller 1115 may manage input and output signals for the channel engineering device 1105. The I/O controller 1115 may also manage peripherals not integrated into the channel engineering device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the channel engineering device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the channel engineering device 1105 to perform various functions (e.g., functions or tasks supporting uplink beam management using a configurable deflector).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
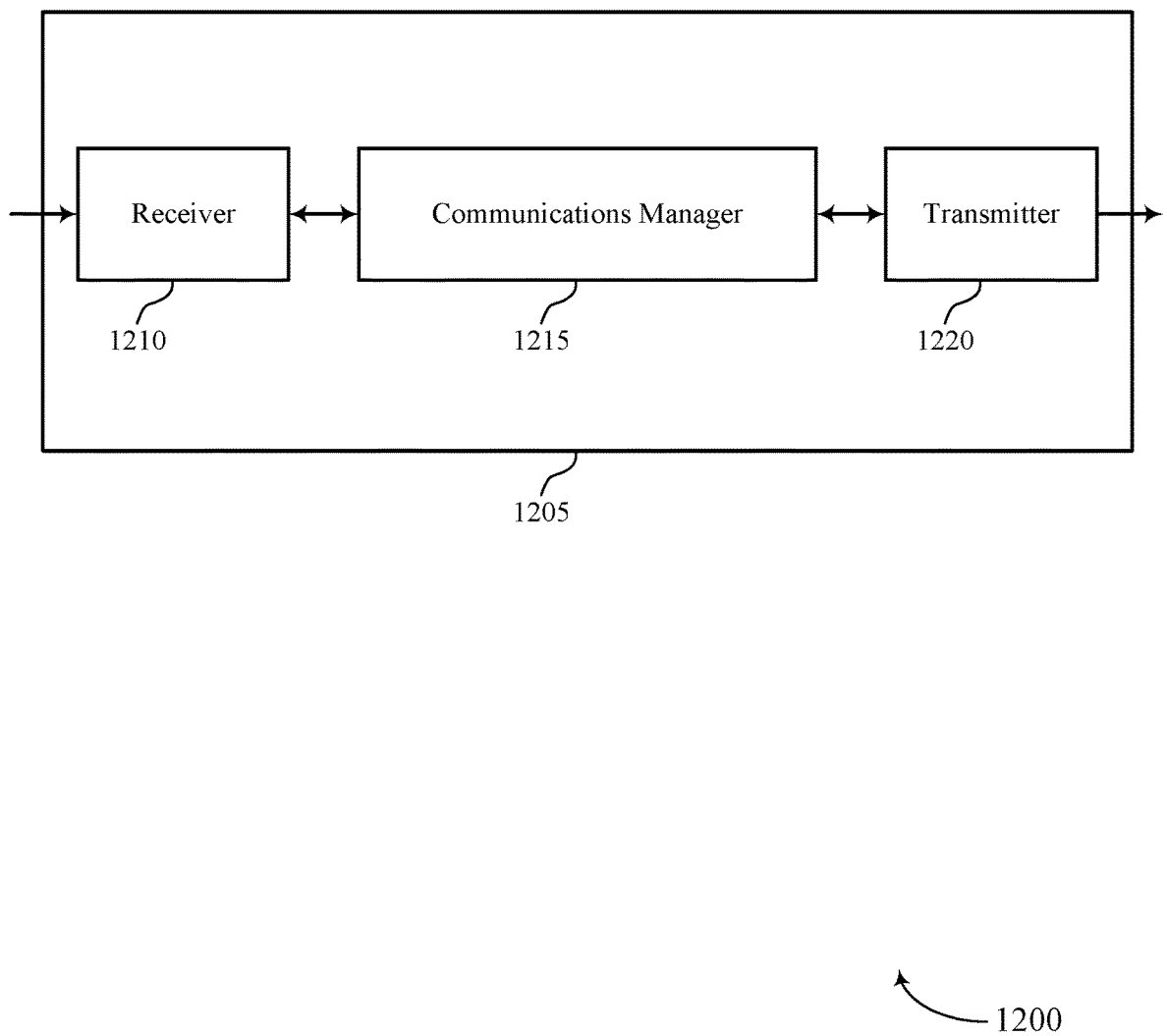
FIGS. 12 and 13 show block diagrams of devices that support uplink beam management using a configurable deflector in accordance with aspects of the present disclosure.

FIG. 12 shows a block diagram 1200 of a device 1205 that supports uplink beam management using a configurable deflector in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink beam management using a configurable deflector, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a channel engineering device, control signaling indicating a set of configurations for deflecting a set of uplink reference signal transmissions received from a UE, receive each of the set of uplink reference signal transmissions according to a corresponding configuration of the set of configurations based on transmitting the control signaling indicating the set of configurations, and transmit, to the channel engineering device based on receiving each of the set of uplink reference signal transmissions, an indication of a configuration of the set of configurations for the channel engineering device to use to deflect subsequent transmissions from the UE to the base station. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
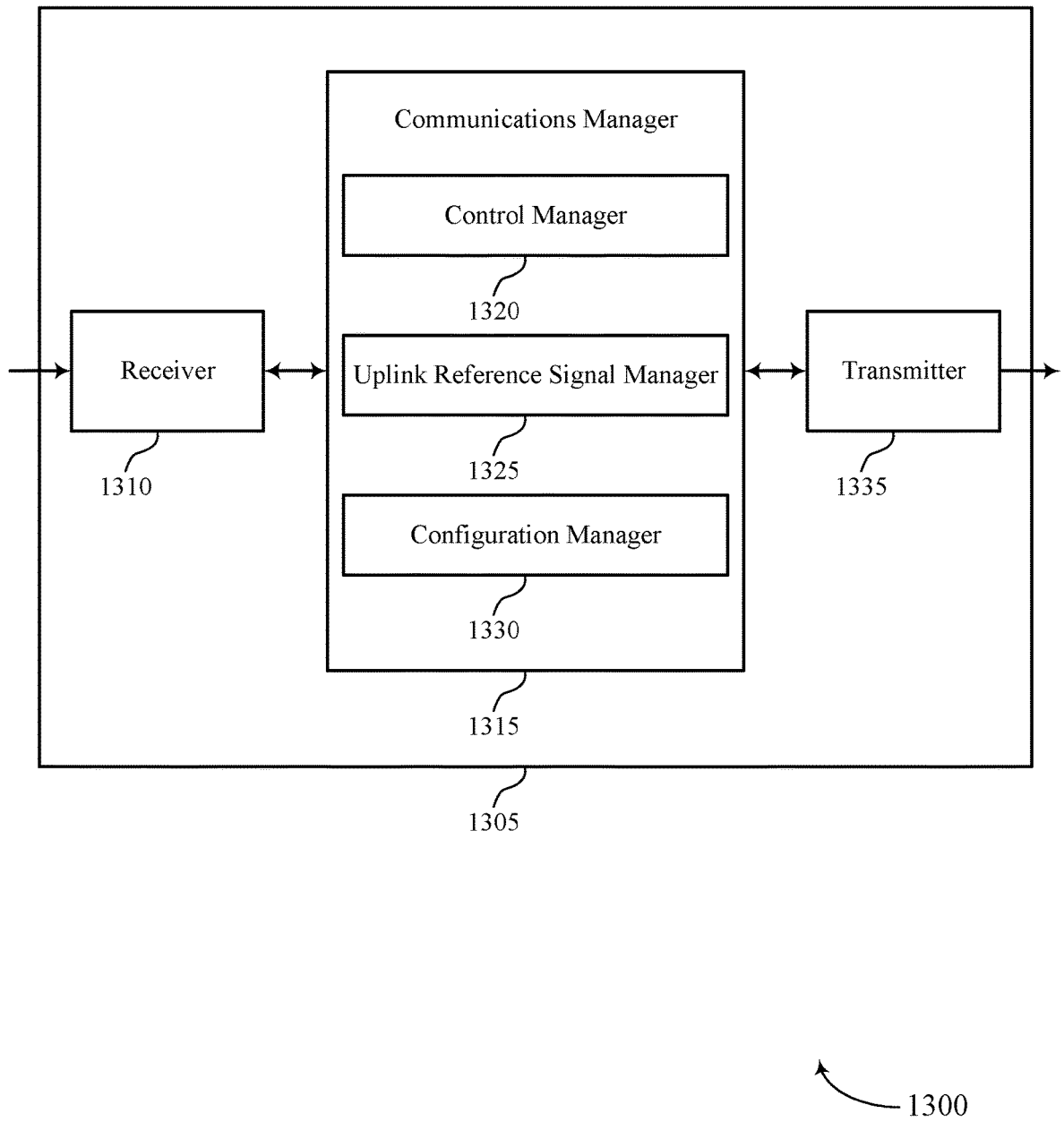

FIG. 13 shows a block diagram 1300 of a device 1305 that supports uplink beam management using a configurable deflector in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink beam management using a configurable deflector, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a control manager 1320, an uplink reference signal manager 1325, and a configuration manager 1330. The communications manager 1315 may be an example of aspects of the communications manager 1510 described herein.

The control manager 1320 may transmit, to a channel engineering device, control signaling indicating a set of configurations for deflecting a set of uplink reference signal transmissions received from a UE. The uplink reference signal manager 1325 may receive each of the set of uplink reference signal transmissions according to a corresponding configuration of the set of configurations based on transmitting the control signaling indicating the set of configurations. The configuration manager 1330 may transmit, to the channel engineering device based on receiving each of the set of uplink reference signal transmissions, an indication of a configuration of the set of configurations for the channel engineering device to use to deflect subsequent transmissions from the UE to the base station.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
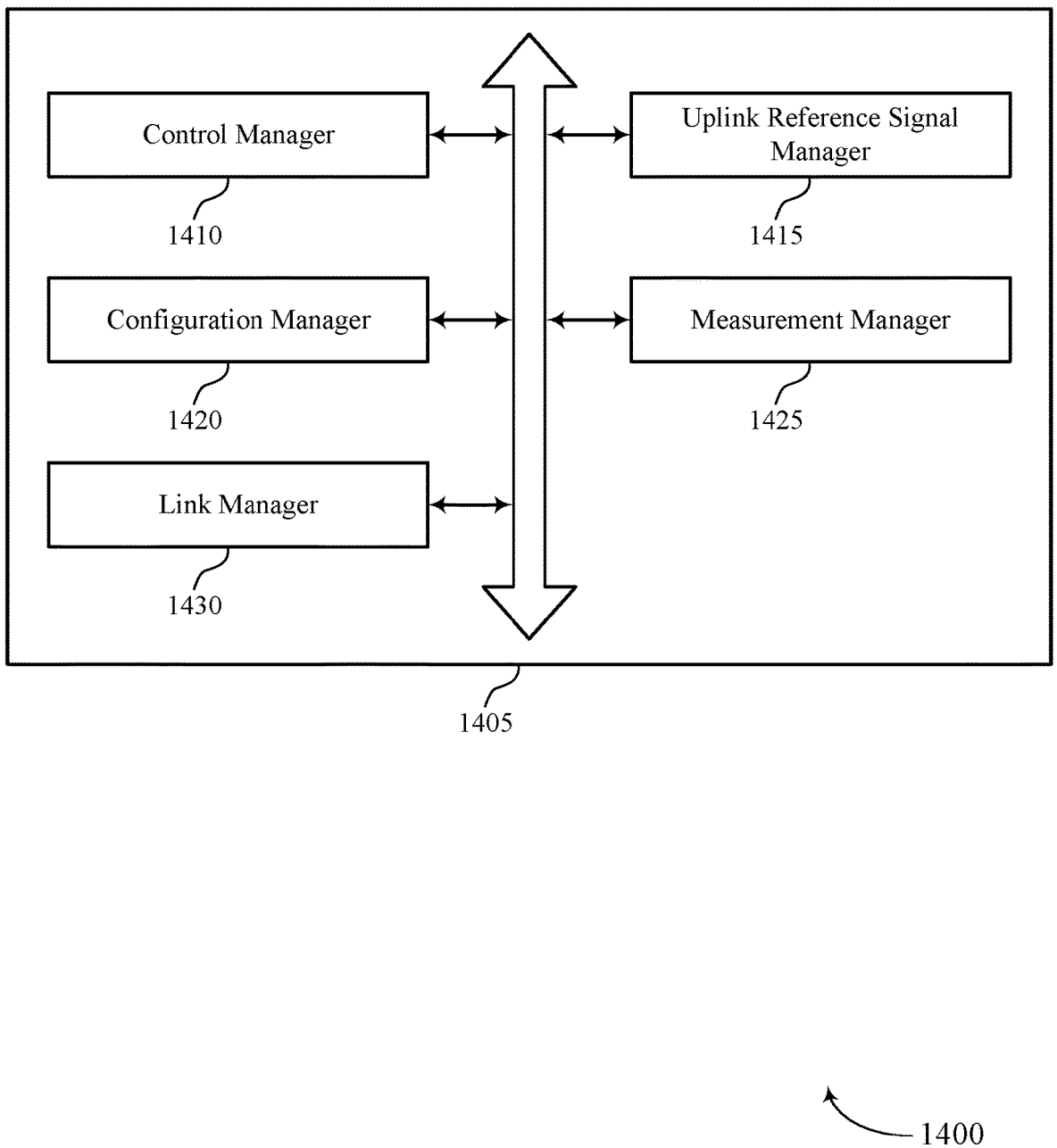
FIG. 14 shows a block diagram of a communications manager that supports uplink beam management using a configurable deflector in accordance with aspects of the present disclosure.

FIG. 14 shows a block diagram 1400 of a communications manager 1405 that supports uplink beam management using a configurable deflector in accordance with aspects of the present disclosure. The communications manager 1405 may be an example of aspects of a communications manager 1215, a communications manager 1315, or a communications manager 1510 described herein. The communications manager 1405 may include a control manager 1410, an uplink reference signal manager 1415, a configuration manager 1420, a measurement manager 1425, and a link manager 1430. Each of these modules may communicate, directly or indirectly, with one another (e.g., via one or more buses).

The control manager 1410 may transmit, to a channel engineering device, control signaling indicating a set of configurations for deflecting a set of uplink reference signal transmissions received from a UE. The uplink reference signal manager 1415 may receive each of the set of uplink reference signal transmissions according to a corresponding configuration of the set of configurations based on transmitting the control signaling indicating the set of configurations. The configuration manager 1420 may transmit, to the channel engineering device based on receiving each of the set of uplink reference signal transmissions, an indication of a configuration of the set of configurations for the channel engineering device to use to deflect subsequent transmissions from the UE to the base station.

The measurement manager 1425 may perform measurements on each of the set of uplink reference signal transmissions received at the base station. In some examples, the configuration manager 1420 may select the configuration of the set of configurations for the channel engineering device to use to deflect subsequent transmissions from the UE to the base station based on the measurements, where transmitting the indication of the configuration of the set of configurations is based on the selecting. In some cases, the measurements include signal quality measurements, signal direction measurements, or a combination thereof.

In some examples, the uplink reference signal manager 1415 may receive the set of uplink reference signal transmissions using a beam sweep. In some examples, the uplink reference signal manager 1415 may receive the set of uplink reference signal transmissions in consecutive symbols of a time duration indicated by the control signaling. In some examples, the uplink reference signal manager 1415 may receive the set of uplink reference signal transmissions in non-consecutive symbols of a time duration indicated by the received control signaling. In some cases, the set of uplink reference signal transmissions includes a set of sounding reference signal transmissions.

The link manager 1430 may establish a communication link with the channel engineering device. In some examples, the configuration manager 1420 may receive, from the channel engineering device, an indication of a set of potential configurations of the channel engineering device, the control signaling transmitted based on the set of potential configurations. In some cases, the control signaling indicating the set of configurations includes indicates a set of settings to adjust an electronic metamaterial of the channel engineering device to focus received signal energy, reflect received signal energy, refract received signal energy, filter received signal energy, or any combination thereof.

Figure 15:
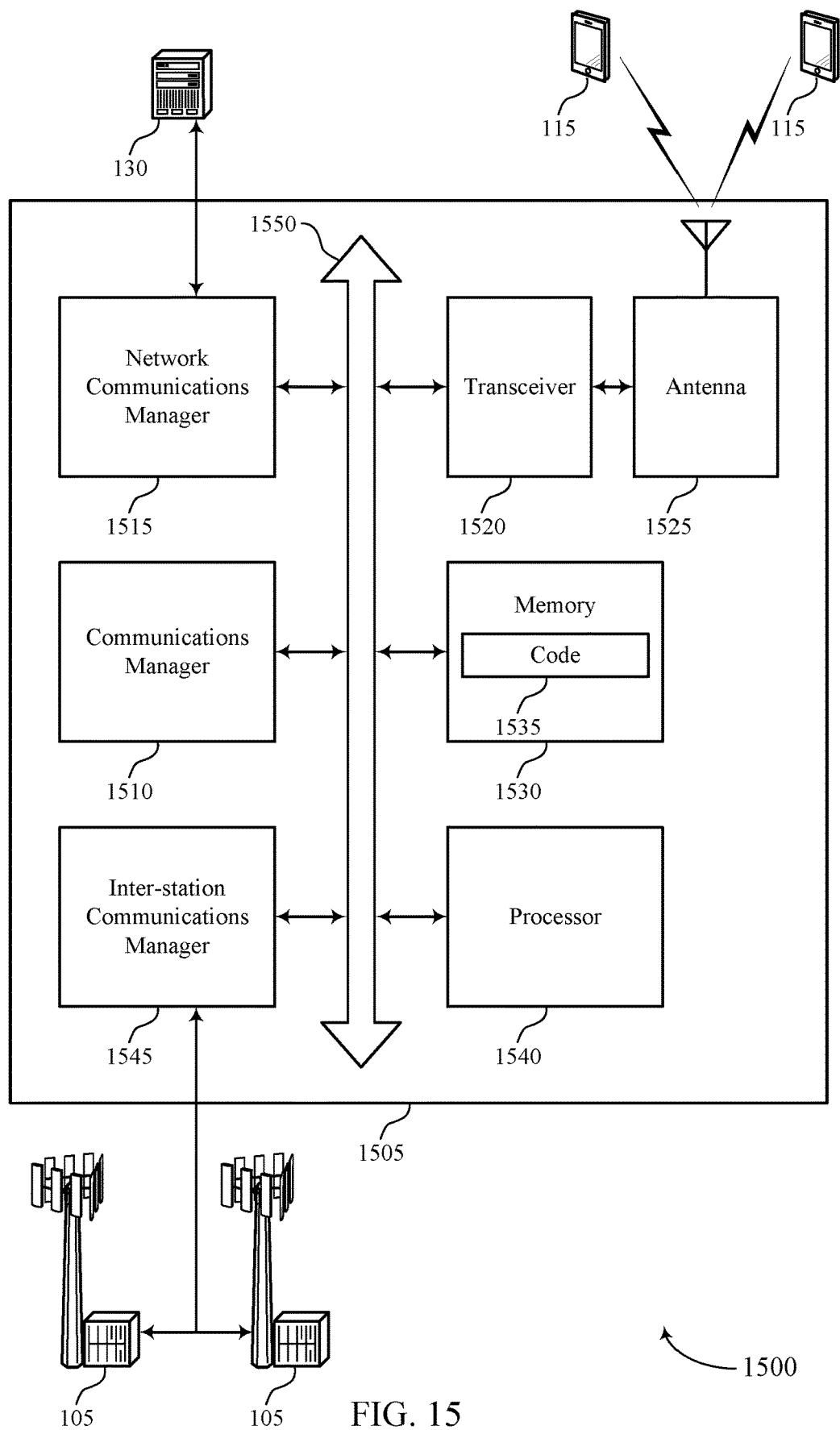
FIG. 15 shows a diagram of a system including a device that supports uplink beam management using a configurable deflector in accordance with aspects of the present disclosure.

FIG. 15 shows a diagram of a system 1500 including a device 1505 that supports uplink beam management using a configurable deflector in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a channel engineering device, control signaling indicating a set of configurations for deflecting a set of uplink reference signal transmissions received from a UE, receive each of the set of uplink reference signal transmissions according to a corresponding configuration of the set of configurations based on transmitting the control signaling indicating the set of configurations, and transmit, to the channel engineering device based on receiving each of the set of uplink reference signal transmissions, an indication of a configuration of the set of configurations for the channel engineering device to use to deflect subsequent transmissions from the UE to the base station.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink beam management using a configurable deflector).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
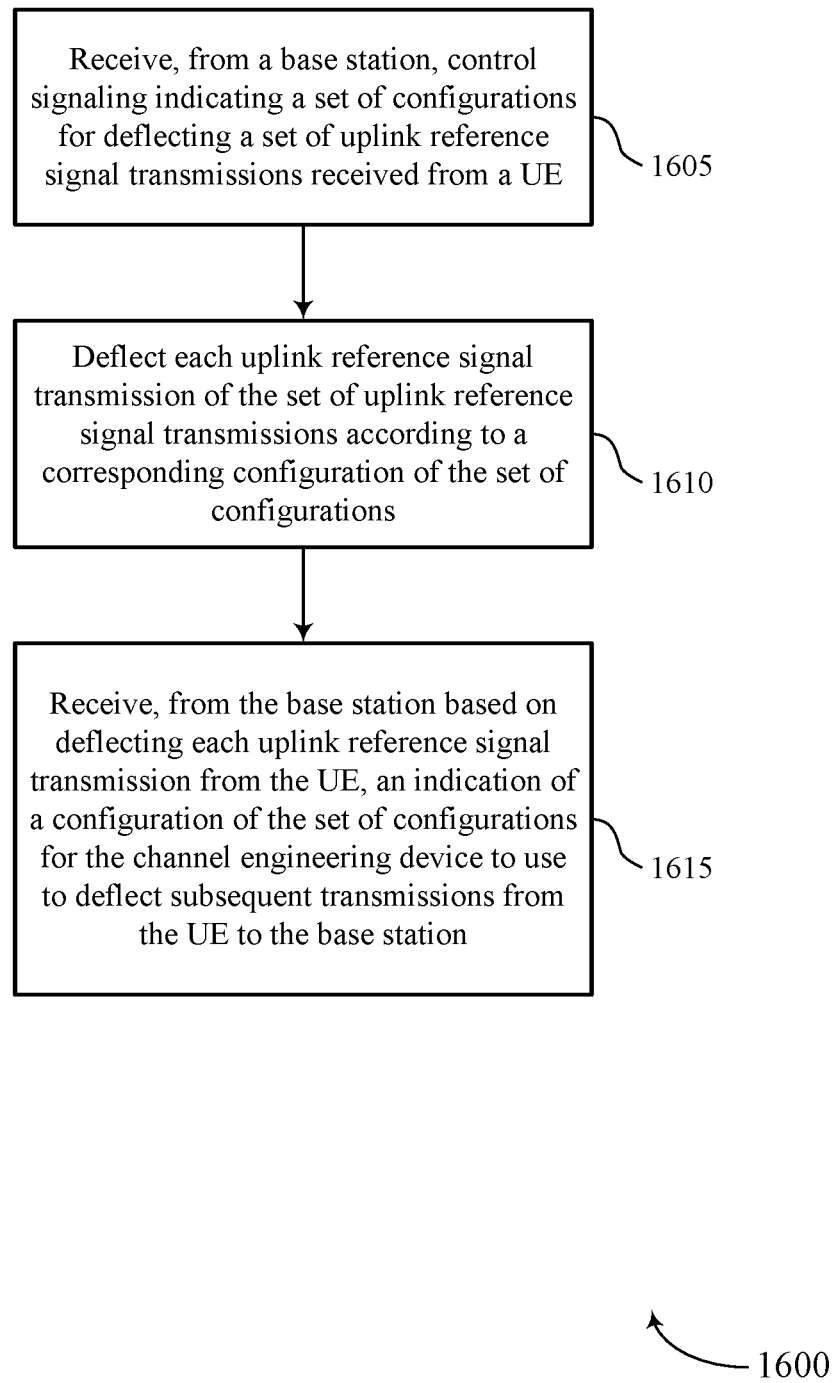
FIGS. 16 and 17 show flowcharts illustrating methods that support uplink beam management using a configurable deflector in accordance with aspects of the present disclosure.

FIG. 16 shows a flowchart illustrating a method 1600 that supports uplink beam management using a configurable deflector in accordance with aspects of the present disclosure. The operations of method 1600 may be implemented by a channel engineering device or its components as described herein. For example, the operations of method 1600 may be performed by a communications manager as described with reference to FIGS. 8 through 11. In some examples, a channel engineering device may execute a set of instructions to control the functional elements of the channel engineering device to perform the functions described below. Additionally, or alternatively, a channel engineering device may perform aspects of the functions described below using special-purpose hardware.

At 1605, the channel engineering device may receive, from a base station, control signaling indicating a set of configurations for deflecting a set of uplink reference signal transmissions received from a UE. The operations of 1605 may be performed according to the methods described herein. In some examples, aspects of the operations of 1605 may be performed by a control manager as described with reference to FIGS. 8 through 11.

At 1610, the channel engineering device may deflect each uplink reference signal transmission of the set of uplink reference signal transmissions according to a corresponding configuration of the set of configurations. The operations of 1610 may be performed according to the methods described herein. In some examples, aspects of the operations of 1610 may be performed by an uplink reference signal manager as described with reference to FIGS. 8 through 11.

At 1615, the channel engineering device may receive, from the base station based on deflecting each uplink reference signal transmission from the UE, an indication of a configuration of the set of configurations for the channel engineering device to use to deflect subsequent transmissions from the UE to the base station. The operations of 1615 may be performed according to the methods described herein. In some examples, aspects of the operations of 1615 may be performed by a configuration manager as described with reference to FIGS. 8 through 11.

Figure 17:
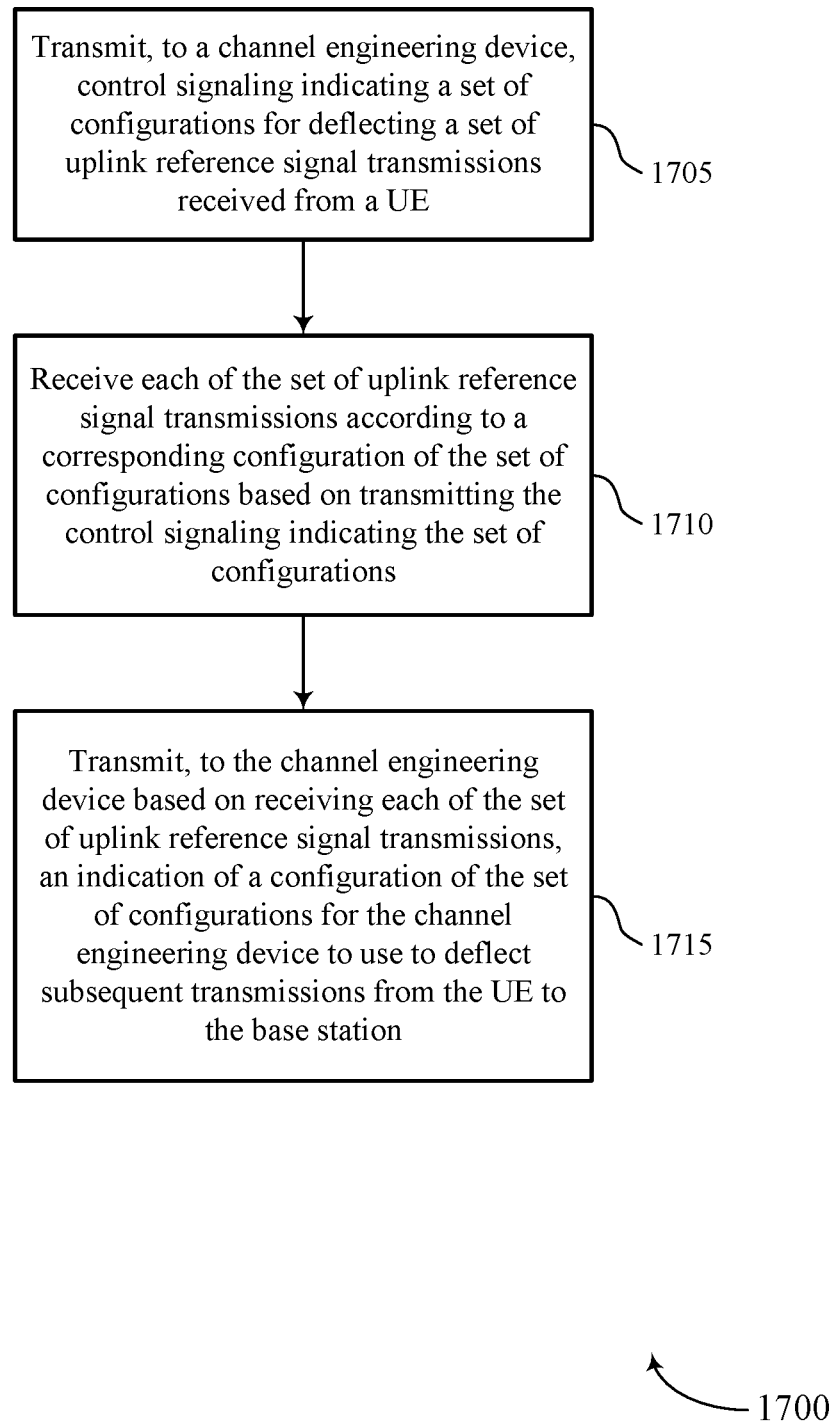

FIG. 17 shows a flowchart illustrating a method 1700 that supports uplink beam management using a configurable deflector in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may transmit, to a channel engineering device, control signaling indicating a set of configurations for deflecting a set of uplink reference signal transmissions received from a UE. The operations of 1705 may be performed according to the methods described herein. In some examples, aspects of the operations of 1705 may be performed by a control manager as described with reference to FIGS. 12 through 15.

At 1710, the base station may receive each of the set of uplink reference signal transmissions according to a corresponding configuration of the set of configurations based on transmitting the control signaling indicating the set of configurations. The operations of 1710 may be performed according to the methods described herein. In some examples, aspects of the operations of 1710 may be performed by an uplink reference signal manager as described with reference to FIGS. 12 through 15.

At 1715, the base station may transmit, to the channel engineering device based on receiving each of the set of uplink reference signal transmissions, an indication of a configuration of the set of configurations for the channel engineering device to use to deflect subsequent transmissions from the UE to the base station. The operations of 1715 may be performed according to the methods described herein. In some examples, aspects of the operations of 1715 may be performed by a configuration manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a channel engineering device, comprising: receiving, from a base station, control signaling indicating a plurality of configurations for deflecting a set of uplink reference signal transmissions received from a UE; deflecting each uplink reference signal transmission of the set of uplink reference signal transmissions according to a corresponding configuration of the plurality of configurations; and receiving, from the base station based at least in part on deflecting each uplink reference signal transmission from the UE, an indication of a configuration of the plurality of configurations for the channel engineering device to use to deflect subsequent transmissions from the UE to the base station.

Aspect 2: The method of aspect 1, further comprising: receiving the set of uplink reference signal transmissions from the UE on a single beam, wherein deflecting each uplink reference signal transmission of the set of uplink reference signal transmissions according to a corresponding configuration of the plurality of configurations comprises beam sweeping the set of uplink reference signal transmissions.

Aspect 3: The method of aspect 2, wherein receiving the set of uplink reference signal transmissions from the UE on the single beam comprises: receiving the set of uplink reference signal transmissions from the UE in consecutive symbols of a time duration indicated by the received control signaling.

Aspect 4: The method of any of aspects 2 through 3, wherein receiving the set of uplink reference signal transmissions from the UE on the single beam comprises: receiving the set of uplink reference signal transmissions from the UE in non-consecutive symbols of a time duration indicated by the received control signaling.

Aspect 5: The method of any of aspects 1 through 4, wherein each of the plurality of configurations corresponds to a different angle at which the channel engineering device is to deflect an uplink reference signal transmission.

Aspect 6: The method of any of aspects 1 through 5, wherein the set of uplink reference signal transmissions comprises a set of sounding reference signal transmissions.

Aspect 7: The method of any of aspects 1 through 6, wherein the control signaling indicating the plurality of configurations comprises a plurality of settings to adjust an electronic metamaterial of the channel engineering device to focus received signal energy, reflect received signal energy, refract received signal energy, filter received signal energy, or any combination thereof.

Aspect 8: A method for wireless communication at a base station, comprising: transmitting, to a channel engineering device, control signaling indicating a plurality of configurations for deflecting a set of uplink reference signal transmissions received from a UE; receiving each of the set of uplink reference signal transmissions according to a corresponding configuration of the plurality of configurations based at least in part on transmitting the control signaling indicating the plurality of configurations; and transmitting, to the channel engineering device based at least in part on receiving each of the set of uplink reference signal transmissions, an indication of a configuration of the plurality of configurations for the channel engineering device to use to deflect subsequent transmissions from the UE to the base station.

Aspect 9: The method of aspect 8, further comprising: performing measurements on each of the set of uplink reference signal transmissions received at the base station; and selecting the configuration of the plurality of configurations for the channel engineering device to use to deflect subsequent transmissions from the UE to the base station based at least in part on the measurements, wherein transmitting the indication of the configuration of the plurality of configurations is based at least in part on the selecting.

Aspect 10: The method of aspect 9, wherein the measurements comprise signal quality measurements, signal direction measurements, or a combination thereof.

Aspect 11: The method of any of aspects 8 through 10, wherein receiving each of the set of uplink reference signal transmissions according to the corresponding configuration of the plurality of configurations comprises: receiving the set of uplink reference signal transmissions using a beam sweep.

Aspect 12: The method of any of aspects 8 through 11, wherein receiving each of the set of uplink reference signal transmissions comprises: receiving the set of uplink reference signal transmissions in consecutive symbols of a time duration indicated by the control signaling.

Aspect 13: The method of any of aspects 8 through 12, wherein receiving each of the set of uplink reference signal transmissions comprises: receiving the set of uplink reference signal transmissions in non-consecutive symbols of a time duration indicated by the received control signaling.

Aspect 14: The method of any of aspects 8 through 13, wherein the set of uplink reference signal transmissions comprises a set of sounding reference signal transmissions.

Aspect 15: The method of any of aspects 8 through 14, further comprising: establishing a communication link with the channel engineering device; and receiving, from the channel engineering device, an indication of a set of potential configurations of the channel engineering device, the control signaling transmitted based at least in part on the set of potential configurations.

Aspect 16: The method of any of aspects 8 through 15, wherein the control signaling indicating the plurality of configurations comprises a plurality of settings to adjust an electronic metamaterial of the channel engineering device to focus received signal energy, reflect received signal energy, refract received signal energy, filter received signal energy, or any combination thereof.

Aspect 17: An apparatus for wireless communication at a channel engineering device, comprising a processor; memory coupled with the processor; and instructions stored in the memory and executable by the processor to cause the apparatus to perform a method of any of aspects 1 through 7.

Aspect 18: An apparatus for wireless communication at a channel engineering device, comprising at least one means for performing a method of any of aspects 1 through 7.

Aspect 19: A non-transitory computer-readable medium storing code for wireless communication at a channel engineering device, the code comprising instructions executable by a processor to perform a method of any of aspects 1 through 7.

Aspect 20: An apparatus for wireless communication at a base station, comprising a processor; memory coupled with the processor; and instructions stored in the memory and executable by the processor to cause the apparatus to perform a method of any of aspects 8 through 16.

Aspect 21: An apparatus for wireless communication at a base station, comprising at least one means for performing a method of any of aspects 8 through 16.

Aspect 22: A non-transitory computer-readable medium storing code for wireless communication at a base station, the code comprising instructions executable by a processor to perform a method of any of aspects 8 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a channel engineering device, comprising:
   receiving, from a base station, control signaling indicating a plurality of configurations for deflecting a set of uplink reference signal transmissions received from a user equipment (UE);
   deflecting each uplink reference signal transmission of the set of uplink reference signal transmissions according to a corresponding configuration of the plurality of configurations; and
   receiving, from the base station based at least in part on the deflecting each uplink reference signal transmission from the UE, an indication of a configuration of the plurality of configurations for the channel engineering device to use to deflect subsequent transmissions from the UE to the base station.

2. The method of claim 1, further comprising:
   receiving the set of uplink reference signal transmissions from the UE on a single beam, wherein the deflecting each uplink reference signal transmission of the set of uplink reference signal transmissions according to a corresponding configuration of the plurality of configurations comprises beam sweeping the set of uplink reference signal transmissions.

3. The method of claim 2, wherein receiving the set of uplink reference signal transmissions from the UE on the single beam comprises:
   receiving the set of uplink reference signal transmissions from the UE in consecutive symbols of a time duration indicated by the received control signaling.

4. The method of claim 2, wherein receiving the set of uplink reference signal transmissions from the UE on the single beam comprises:
   receiving the set of uplink reference signal transmissions from the UE in non-consecutive symbols of a time duration indicated by the received control signaling.

5. The method of claim 1, wherein each of the plurality of configurations corresponds to a different angle at which the channel engineering device is to deflect an uplink reference signal transmission.

6. The method of claim 1, wherein the set of uplink reference signal transmissions comprises a set of sounding reference signal transmissions.

7. The method of claim 1, wherein the control signaling indicating the plurality of configurations comprises a plurality of settings to adjust an electronic metamaterial of the channel engineering device to focus received signal energy, reflect received signal energy, refract received signal energy, filter received signal energy, or any combination thereof.

8. A method for wireless communication at a base station, comprising:
   transmitting, to a channel engineering device, control signaling indicating a plurality of configurations for deflecting a set of uplink reference signal transmissions received from a user equipment (UE);

receiving each of the set of uplink reference signal transmissions according to a corresponding configuration of the plurality of configurations based at least in part on the transmitting the control signaling indicating the plurality of configurations; and transmitting, to the channel engineering device based at least in part on the receiving each of the set of uplink reference signal transmissions, an indication of a configuration of the plurality of configurations for the channel engineering device to use to deflect subsequent transmissions from the UE to the base station.

9. The method of claim 8, further comprising:

performing measurements on each of the set of uplink reference signal transmissions received at the base station; and selecting the configuration of the plurality of configurations for the channel engineering device to use to deflect subsequent transmissions from the UE to the base station based at least in part on the measurements, wherein transmitting the indication of the configuration of the plurality of configurations is based at least in part on the selecting.

10. The method of claim 9, wherein the measurements comprise signal quality measurements, signal direction measurements, or a combination thereof.

11. The method of claim 8, wherein receiving each of the set of uplink reference signal transmissions according to the corresponding configuration of the plurality of configurations comprises:

receiving the set of uplink reference signal transmissions using a beam sweep.

12. The method of claim 8, wherein receiving each of the set of uplink reference signal transmissions comprises:

receiving the set of uplink reference signal transmissions in consecutive symbols of a time duration indicated by the control signaling.

13. The method of claim 8, wherein receiving each of the set of uplink reference signal transmissions comprises:

receiving the set of uplink reference signal transmissions in non-consecutive symbols of a time duration indicated by the control signaling.

14. The method of claim 8, wherein the set of uplink reference signal transmissions comprises a set of sounding reference signal transmissions.

15. The method of claim 8, further comprising:

establishing a communication link with the channel engineering device; and receiving, from the channel engineering device, an indication of a set of potential configurations of the channel engineering device, the control signaling transmitted based at least in part on the set of potential configurations.

16. The method of claim 8, wherein the control signaling indicating the plurality of configurations comprises a plurality of settings to adjust an electronic metamaterial of the channel engineering device to focus received signal energy, reflect received signal energy, refract received signal energy, filter received signal energy, or any combination thereof.

17. An apparatus for wireless communication at a channel engineering device, comprising:

a processor, memory coupled with the processor; and instructions stored in the memory and executable by the processor to cause the apparatus to:

receive, from a base station, control signaling indicating a plurality of configurations for deflecting a set of uplink reference signal transmissions received from a user equipment (UE);

deflect each uplink reference signal transmission of the set of uplink reference signal transmissions according to a corresponding configuration of the plurality of configurations; and receive, from the base station based at least in part on the deflecting each uplink reference signal transmission from the UE, an indication of a configuration of the plurality of configurations for the channel engineering device to use to deflect subsequent transmissions from the UE to the base station.

18. The apparatus of claim 17, wherein the instructions are further executable by the processor to cause the apparatus to:

receive the set of uplink reference signal transmissions from the UE on a single beam, wherein the deflecting each uplink reference signal transmission of the set of uplink reference signal transmissions according to a corresponding configuration of the plurality of configurations comprises beam sweeping the set of uplink reference signal transmissions.

19. The apparatus of claim 18, wherein the instructions to receive the set of uplink reference signal transmissions from the UE on the single beam are executable by the processor to cause the apparatus to:

receive the set of uplink reference signal transmissions from the UE in consecutive symbols of a time duration indicated by the received control signaling.

20. The apparatus of claim 18, wherein the instructions to receive the set of uplink reference signal transmissions from the UE on the single beam are executable by the processor to cause the apparatus to:

receive the set of uplink reference signal transmissions from the UE in non-consecutive symbols of a time duration indicated by the received control signaling.

21. The apparatus of claim 17, wherein each of the plurality of configurations corresponds to a different angle at which the channel engineering device is to deflect an uplink reference signal transmission.

22. The apparatus of claim 17, wherein the set of uplink reference signal transmissions comprises a set of sounding reference signal transmissions.

23. The apparatus of claim 17, wherein the control signaling indicating the plurality of configurations comprises a plurality of settings to adjust an electronic metamaterial of the channel engineering device to focus received signal energy, reflect received signal energy, refract received signal energy, filter received signal energy, or any combination thereof.

24. An apparatus for wireless communication at a base station, comprising:

a processor, memory coupled with the processor; and instructions stored in the memory and executable by the processor to cause the apparatus to:

transmit, to a channel engineering device, control signaling indicating a plurality of configurations for deflecting a set of uplink reference signal transmissions received from a user equipment (UE);

receive each of the set of uplink reference signal transmissions according to a corresponding configuration of the plurality of configurations based at least in part on the transmitting the control signaling indicating the plurality of configurations; and transmit, to the channel engineering device based at least in part on the receiving each of the set of uplink reference signal transmissions, an indication of a configuration of the plurality of configurations for the channel engineering device to use to deflect subsequent transmissions from the UE to the base station.

25. The apparatus of claim 24, wherein the instructions are further executable by the processor to cause the apparatus to:
perform measurements on each of the set of uplink reference signal transmissions received at the base station; and
select the configuration of the plurality of configurations for the channel engineering device to use to deflect subsequent transmissions from the UE to the base station based at least in part on the measurements, wherein transmitting the indication of the configuration of the plurality of configurations is based at least in part on the selecting.

26. The apparatus of claim 25, wherein the measurements comprise signal quality measurements, signal direction measurements, or a combination thereof.

27. The apparatus of claim 24, wherein the instructions to receive each of the set of uplink reference signal transmissions according to the corresponding configuration of the plurality of configurations are executable by the processor to cause the apparatus to:
receive the set of uplink reference signal transmissions using a beam sweep.

28. The apparatus of claim 24, wherein the instructions to receive each of the set of uplink reference signal transmissions are executable by the processor to cause the apparatus to:
receive the set of uplink reference signal transmissions in consecutive symbols of a time duration indicated by the control signaling.

29. The apparatus of claim 24, wherein the instructions to receive each of the set of uplink reference signal transmissions are executable by the processor to cause the apparatus to:
receive the set of uplink reference signal transmissions in non-consecutive symbols of a time duration indicated by the control signaling.

30. The apparatus of claim 24, wherein the set of uplink reference signal transmissions comprises a set of sounding reference signal transmissions.

* * * * *